United States Patent
Kawai

(10) Patent No.: US 10,454,673 B2
(45) Date of Patent: Oct. 22, 2019

(54) CRYPTOGRAPHIC SYSTEM, MASTER KEY UPDATE APPARATUS, AND NON-TRANSITORY COMPUTER-READABLE RECORDING MEDIUM STORING MASTER KEY UPDATE PROGRAM

(71) Applicant: MITSUBISHI ELECTRIC CORPORATION, Tokyo (JP)

(72) Inventor: Yutaka Kawai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 138 days.

(21) Appl. No.: 15/523,195

(22) PCT Filed: Dec. 5, 2014

(86) PCT No.: PCT/JP2014/082256
§ 371 (c)(1),
(2) Date: Apr. 28, 2017

(87) PCT Pub. No.: WO2016/088251
PCT Pub. Date: Jun. 9, 2016

(65) Prior Publication Data
US 2017/0331622 A1 Nov. 16, 2017

(51) Int. Cl.
*H04K 1/00* (2006.01)
*H04L 9/08* (2006.01)
(Continued)

(52) U.S. Cl.
CPC .............. *H04L 9/0847* (2013.01); *H04L 9/08* (2013.01); *H04L 9/16* (2013.01); *H04L 9/3066* (2013.01);
(Continued)

(58) Field of Classification Search
CPC ............ H04L 9/3073; H04L 2209/601; H04L 9/0822; H04L 9/08; H04L 9/0847;
(Continued)

(56) References Cited

U.S. PATENT DOCUMENTS 7,401,232 B2   7/2008  Ono et al.
8,559,638 B2  10/2013  Takashima et al.
(Continued)

FOREIGN PATENT DOCUMENTS

JP   2005-176144 A   6/2005
JP   2007-181214 A   7/2007
(Continued)

OTHER PUBLICATIONS

Balfe et al., "Key Refreshing in Identity-based Cryptography and its Application in MANETS", pp. 1-7.
(Continued)

*Primary Examiner* — Gary S Gracia
(74) *Attorney, Agent, or Firm* — Birch, Stewart, Kolasch & Birch, LLP

(57) ABSTRACT

A master key update apparatus (400) acquires a master public key mpk including a basis B and a master secret key msk including a basis B* which is different from the basis B included in the master public key mpk. The master key update apparatus (400) updates the basis B included in the master public key mpk with updating information upk so as to generate a new master public key mpk', and updates the basis B* included in the master secret key msk with the updating information upk so as to generate a new master secret key msk'.

5 Claims, 19 Drawing Sheets

(51) Int. Cl.
*H04L 9/16* (2006.01)
*H04L 9/30* (2006.01)
*H04L 9/32* (2006.01)
*H04W 12/04* (2009.01)
*H04L 9/00* (2006.01)

(52) U.S. Cl.
CPC .......... *H04L 9/3073* (2013.01); *H04L 9/3263* (2013.01); *H04W 12/04* (2013.01)

(58) Field of Classification Search
CPC ....... H04L 9/16; H04L 9/3066; H04L 9/3263; H04W 12/04
USPC ............................................ 713/171; 380/30
See application file for complete search history.

(56) References Cited

U.S. PATENT DOCUMENTS

| | | | |
|---|---|---|---|
| 8,913,742 B2 | 12/2014 | Takashima et al. | |
| 9,426,131 B2 | 8/2016 | Hayashi et al. | |
| 2005/0021985 A1 | 1/2005 | Ono et al. | |
| 2012/0045056 A1* | 2/2012 | Takashima | H04L 9/0836 380/255 |
| 2012/0284530 A1* | 11/2012 | Takashima | H04L 9/3073 713/189 |
| 2012/0297201 A1* | 11/2012 | Matsuda | G06F 21/6245 713/189 |
| 2013/0028415 A1 | 1/2013 | Takashima et al. | |
| 2013/0336474 A1* | 12/2013 | Takashima | H04L 9/3073 380/28 |
| 2014/0208117 A1 | 7/2014 | Hayashi et al. | |
| 2014/0298028 A1* | 10/2014 | Takashima | H04L 9/0822 713/171 |

FOREIGN PATENT DOCUMENTS

| | | |
|---|---|---|
| JP | 2008-135816 A | 6/2008 |
| JP | 2010-273317 A | 12/2010 |
| JP | 2012-150287 A | 8/2012 |
| JP | 2013-78042 A | 4/2013 |
| WO | 2011/135895 A1 | 11/2011 |

OTHER PUBLICATIONS

Galindo et al., "Identity-Based Encryption with Master Key-Dependent Message Security and Applications", total pages of 24.

Kitada et al., "A Study on Forward Secure Attribute Based Encryption", 4.2.2, the 31st Symposium on Information Theory and its Applications (SITA2008), Kinugawa, Tochigi, Japan, Oct. 7-10, 2008, pp. 398-403.

Kojima et al., "Forward Secure Ciphertext-Policy Attribute-Based Encryption", the Institute of Electronics, Information and Communication Engineers, SCIS 2013, The 30th Symposium on Cryptography and Information Security Kanazawa, Japan, Jan. 22-25, 2013, pp. 1-8.

Lai et al., "Adaptable Ciphertext-Policy Attribute-Based Encryption", Springer International Publishing Switzerland 2014, Z. Cao and F. Zhang (Eds.): Pairing 2013, LNCS 8365, pp. 199-214.

Yang et al., "A Forward Secure Identity Based Encryption Scheme with Master Key Update", International Symposium on Information Theory and its Applications, ISITA2008, Auckland, New Zealand, Dec. 7-10, 2008, total pages of 7.

* cited by examiner

Fig. 3

$$s_0 = \underbrace{\begin{pmatrix} 1, \ldots, 1 \end{pmatrix}}_{r \text{ COLUMNS}} \begin{pmatrix} f_1, \ldots, f_r \end{pmatrix} = \sum_{k=1}^{r} f_k$$

Fig. 4

$$\vec{s}^T = \begin{pmatrix} M_{1,1} & M_{1,2} & \cdots & M_{1,r} \\ M_{2,1} & M_{2,2} & \cdots & M_{2,r} \\ & & \cdots & \\ M_{L,1} & M_{L,2} & \cdots & M_{L,r} \end{pmatrix} \begin{pmatrix} f_1, & \cdots & , f_r \end{pmatrix} = \begin{pmatrix} s_1, & \cdots & , s_L \end{pmatrix}$$

CRYPTOGRAPHIC SYSTEM, MASTER KEY UPDATE APPARATUS, AND NON-TRANSITORY COMPUTER-READABLE RECORDING MEDIUM STORING MASTER KEY UPDATE PROGRAM

TECHNICAL FIELD

The present invention relates to a technique for updating a master key in a cryptographic system.

BACKGROUND ART

A master public key serving as the basis of all ciphertexts and a master secret key serving as the basis of all user secret keys exist for ID-based encryption, attribute-based encryption, and functional encryption. The master public key and the master secret key involve a risk of deterioration over time just like a public key in general public key cryptography does, and must therefore be updated periodically.

When the master public key and the master secret key are updated, all ciphertexts and all user secret keys must also be updated.

Non-Patent Literature 1 describes update of a master public key and master secret key in ID-based encryption. Non-Patent Literature 1 also describes that when the master public key and the master secret key are updated, a user secret key is not reissued but is updated to cope with this.

Non-Patent Literature 2 describes an encryption scheme that can maintain the security even if information of a master secret key leaks somewhat.

CITATION LIST

Patent Literature

Patent Literature 1: WO 2011/135895

Non-Patent Literature

Non-Patent Literature 1: "A Forward Secure Identity Based Encryption Scheme with Master Key Update" Peng YANG and Kanta MATSUURA in SEISAN KENKYU Vol. 60 (2008) No. 5 P 505-507

Non-Patent Literature 2: "Identity-Based Encryption with Master Key-Dependent Message Security and Applications" David Galindo, Javier Herranz, and Jorge Villar in ESORICS 2012

SUMMARY OF INVENTION

Technical Problem

In Non-Patent Literature 1, when a master public key and a master secret key are updated, a user secret key is not reissued but is updated to cope with this. In Non-Patent Literature 1, however, when the master public key and the master secret key are updated, a ciphertext must be regenerated. Namely, the ciphertext must be restored to a plaintext by decryption, and then must be encrypted again based on a new master public key.

In Non-Patent Literature 2, if information of a mater secret key leaks exceeding an allowed leak amount, the security cannot be maintained. Therefore, a master public key and a master secret key must be updated sooner or later.

The present invention has as its object to implement a method of updating a master public key and a master secret key with which regeneration of a user secret key and a ciphertext is not necessary.

Solution to Problem

A cryptographic system according to the present invention includes a master key update apparatus to acquire a master public key including a basis and a master secret key including a basis which is different from the basis included in the master public key, update the basis included in the master public key with updating information so as to generate a new master public key, and update the basis included in the master secret key with the updating information so as to generate a new master secret key.

Advantageous Effects of Invention

According to the present invention, a master public key and a master secret key are updated by updating a basis included in the master public key and a basis included in the master secret key. A user secret key and a ciphertext are enabled to cope with a new master public key and a new master secret key by updating the basis of the user secret key and the basis of the ciphertext; the user secret key and the ciphertext need not be regenerated.

BRIEF DESCRIPTION OF DRAWINGS

FIG. 3 is an explanatory drawing of a secret value so of secret dispersion.

FIG. 4 is an explanatory drawing of dispersion values $s_1, \ldots, s_L$ of secret dispersion.

DESCRIPTION OF EMBODIMENTS

Embodiment 1.
*Explanation of Notation*
The notation in the following description will be explained.

When A is a random variable or distribution, Formula 101 denotes that y is randomly selected from A according to the distribution of A. Namely, in Formula 101, y is a random number.

$$y \xleftarrow{R} A \qquad \text{[Formula 101]}$$

When A is a set, Formula 102 denotes that y is uniformly selected from A. Namely, in Formula 102, y is a uniform random number.

$$y \xleftarrow{U} A \qquad \text{[Formula 102]}$$

Formula 103 denotes that z is set in y, y is defined by z, or y is substituted by z.

$$y := z \qquad \text{[Formula 103]}$$

When a is a fixed value, Formula 104 denotes an event that a machine (algorithm) A outputs a on input x.

$$A(x) \to a \qquad \text{[Formula 104]}$$

For example, $$A(x) \to 1$$

Formula 105 denotes a field of order q.

$$\mathbb{F}_q \qquad \text{[Formula 105]}$$

Formula 106 denotes a vector representation over finite field $\mathbb{F}_q$.

$$\vec{x} \text{ denotes} \qquad \text{[Formula 106]}$$

$$(x_1, \ldots, x_n) \in \mathbb{F}_q^n$$

Formula 107 denotes the inner-product, indicated by Formula 109, of two vectors $\vec{x}$ and $\vec{v}$ indicated in Formula 108.

$$\vec{x} \cdot \vec{v} \qquad \text{[Formula 107]}$$

$$\vec{x} = (x_1, \ldots, x_n)$$

$$\vec{v} = (v_1, \ldots, v_n) \qquad \text{[Formula 108]}$$

$$\sum_{i=1}^n x_i v_i \qquad \text{[Formula 109]}$$

Note that $X^T$ denotes the transpose of matrix X.

Note that for bases B and B* indicated in Formula 110, Formula 111 is established.

$$\mathbb{B} := (b_1, \ldots, b_N),$$

$$\mathbb{B}^* := (b_1^*, \ldots, b_N^*) \qquad \text{[Formula 110]}$$

$$(x_1, \ldots, x_N) \mathbb{B} := \sum_{i=1}^N x_i b_i,$$

$$(y_1, \ldots, y_N) \mathbb{B}^* := \sum_{i=1}^N y_i b_i^* \qquad \text{[Formula 111]}$$

Note that $\vec{e}_j$ denotes an orthonormal basis vector indicated in Formula 112.

$$\vec{e}_j := (\overbrace{0 \ldots 0}^{j-1}, 1, \overbrace{0 \ldots 0}^{n-j}) \in \mathbb{F}_q^n \text{ for } j = 1, \ldots, n \qquad \text{[Formula 112]}$$

*Description of Outline*

The basics of ciphertext-policy functional encryption will be described, and then the outline of a technique for updating a master public key mpk and a master secret key msk will be described.

The basics of ciphertext-policy functional encryption will be described.

Figure 1:
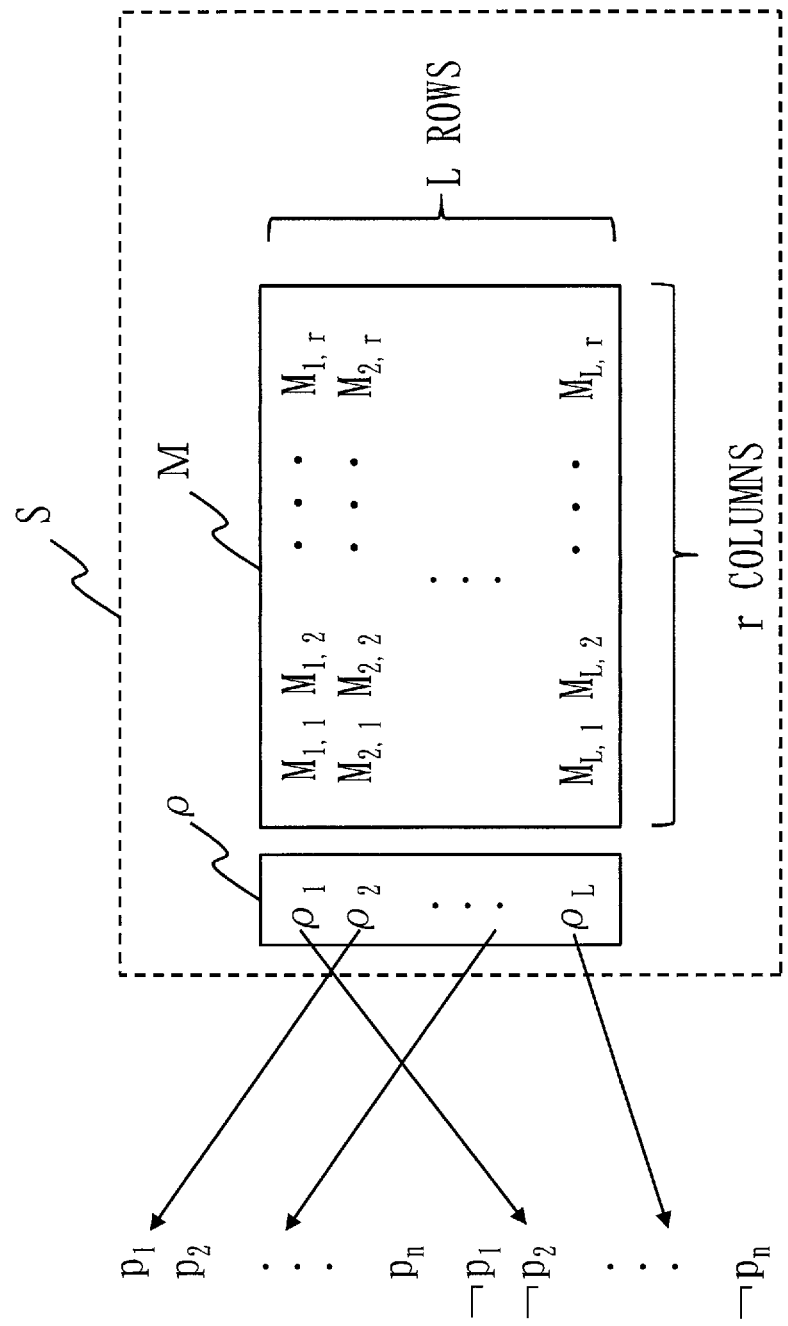
FIG. 1 is an explanatory drawing of an access structure S employed in functional encryption.

FIG. 1 is an explanatory drawing of an access structure S used in functional encryption.

In functional encryption, a tuple of an L-row, r-column secret dispersion matrix M and a label ρ of each row of the secret dispersion matrix M is used as the access structure S. The label ρ of each row is related to one literal of either positive literals {$p_1, \ldots, p_n$} or negative literals {$\neg p_1, \ldots, \neg p_n$} given by a set of variables {$p_1, \ldots, p_n$}.

For an input sequence $\delta = \delta_i \in \{0, 1\}$ (i=1, ..., n), a submatrix Mδ of the secret dispersion matrix M is defined. The submatrix $M_\delta$ consists of those rows of the secret dispersion matrix M, whose labels ρ are related to value "1" by the input sequence δ. Namely, the submatrix $M_\delta$ consists of the rows of the secret dispersion matrix M which are related to $p_i$ with which $\delta_i = 1$ and the rows of the secret dispersion matrix M which are related to $\neg p_i$ with which $\delta_i = 0$.

Figure 2:
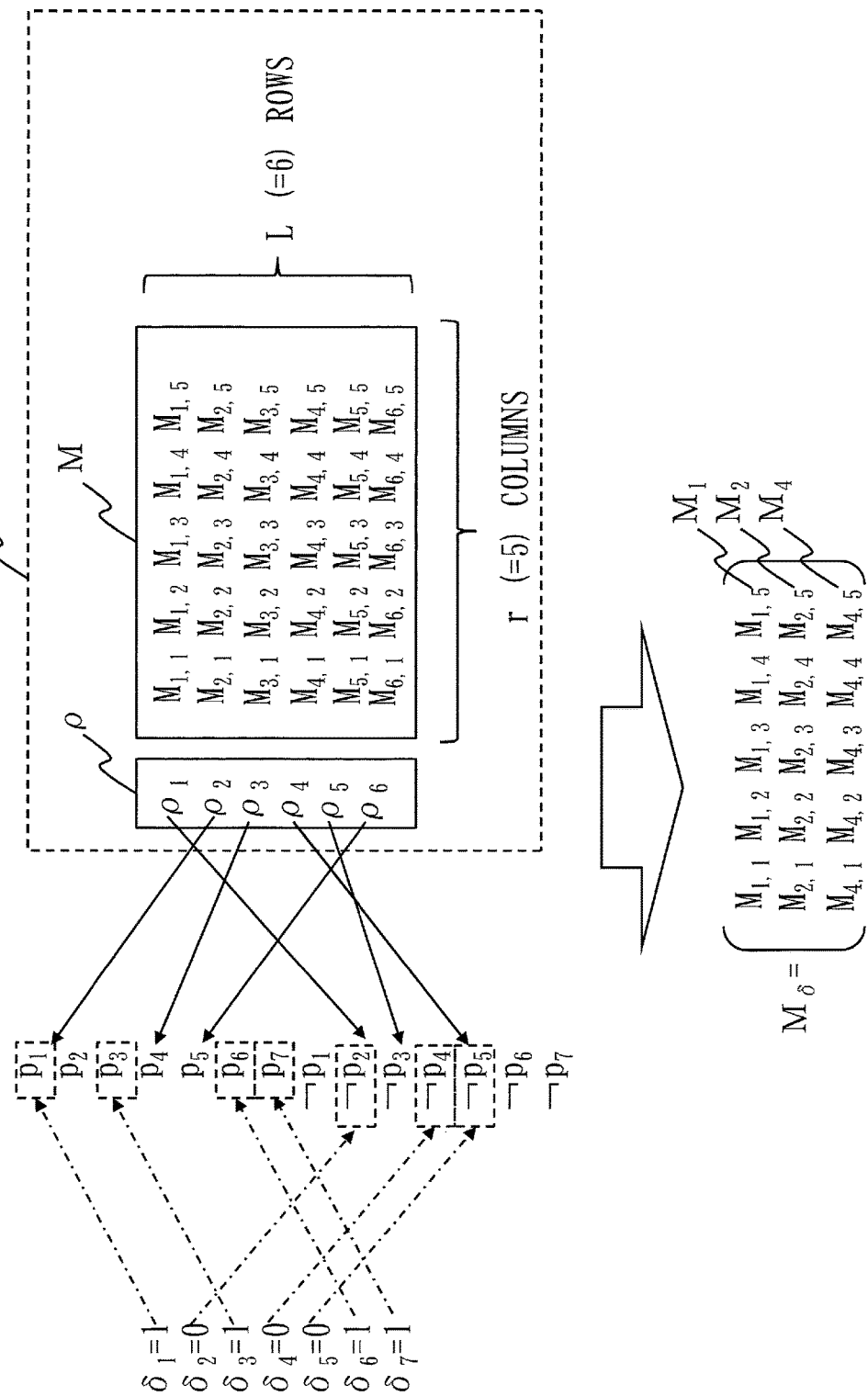
FIG. 2 is an explanatory drawing of a submatrix $M_\delta$.

FIG. 2 is an explanatory drawing of the submatrix $M_\delta$.

Note that in FIG. 2, n=7, L=6, and r=5. That is, the set of variables is {$p_1, \ldots, p_7$}, and the matrix M has 6 rows and 5 columns. In FIG. 2, assume that the labels ρ are related such that $\rho_1$ corresponds to $\neg p_2$, $\rho_2$ to $p_1$, $\rho_3$ to $p_4$, $\rho_4$ to $\neg p_5$, $\rho_5$ to $\neg p_3$, and $\rho_6$ to $\neg p_5$.

Assume that in the input sequence δ, $\delta_1=1$, $\delta_2=0$, $\delta_3=1$, $\delta_4=0$, $\delta_5=0$, $\delta_6=1$, and $\delta_7=1$. In this case, the submatrix $M_\delta$ consists of the rows of the secret dispersion matrix M which are related to literals ($p_1, p_3, p_6, p_7, \neg p_2, \neg p_4, \neg p_5$) surrounded by broken lines in FIG. 2. That is, the submatrix $M_\delta$ consists of the 1st row ($M_1$), 2nd row ($M_2$), and 4th row ($M_4$) of the secret dispersion matrix M.

When $[\rho(j)=p_i] \wedge [\delta_i=1]$ or $[\rho(j)=\neg p_i] \wedge [\delta_i=0]$, then map γ(j)=1; otherwise map γ(j)=0. The former case can be expressed as $M\delta := (M_j)_{\gamma(j)=1}$. Note that $M_j$ is the j-th row of the matrix M.

In functional encryption, each variable p of the set of variables in the access structure S is defined by a tuple (t, $\vec{v}_i$) of an identifier t and a vector $\vec{v}_i$. When an attribute set Γ being a tuple (t, $\vec{x}_t$) of the identifier t and a vector $\vec{x}_t$ is given to the access structure S, then for each integer i of i=1, ..., L, the map γ(i) is defined to satisfy γ(j)=1 if $[\rho(i)=(t, \vec{v}_i)] \wedge [(t, \vec{x}_t) \in \Gamma] \wedge [\vec{v}_i \cdot \vec{x}_t = 0]$ or $[\rho(i)=\neg(t, \vec{v}_i)] \wedge [(t, \vec{x}_t) \in \Gamma] \wedge [\vec{v}_i \cdot \vec{x}_t \neq 0]$, and γ(j)=0 otherwise.

Namely, in functional encryption, the map γ(i) is calculated based on the inner-product of the vectors $\vec{v}_i$ and $\vec{x}_t$. As described above, which row of the secret dispersion matrix M is to be included in the submatrix $M_\delta$ is determined by the map γ(i).

The access structure S accepts the attribute set $\Gamma$ if and only if linear combination of the rows of the submatrix $M_\delta$ gives $\vec{1}$ where $\vec{1}$ is a row vector whose elements are all 1.

For example, in the case of FIG. 2, the access structure S accepts the attribute set $\Gamma$ if and only if linear combination of the respective rows of the submatrix $M_\delta$ consisting of the 1st, 2nd, and 4th rows of the secret dispersion matrix M gives $\vec{1}$. That is, if $\alpha_1$, $\alpha_2$, and $\alpha_4$ exist with which $\alpha_1(M_1)+\alpha_2(M_2)+\alpha_4(M_4)=\vec{1}$, the access structure M accepts the attribute set $\Gamma$.

More specifically, assuming that the set of row numbers of a secret dispersion matrix included in the submatrix $M_\delta$ is defined as I, the access structure S accepts the attribute set $\Gamma$ if a coefficient $\alpha_i$ satisfying $\Sigma_{i \in I} \alpha_i M_i = \vec{1}$ exists.

In ciphertext-policy functional encryption, a key element $k^*_t$ in which the vector $\vec{x}_t$ is set is generated for the identifier t included in the attribute set $\Gamma$ representing the user attribute. Then, a user secret key $sk_\Gamma$ including the key element $k^*_t$ for the identifier t included in the attribute set $\Gamma$ and for t=0 is generated.

The key element $k^*_t$ for each identifier t of the identifier t included in the attribute set $\Gamma$ and of t=0 is a vector on the basis B* whose subbasis B^* is included in the master secret key msk.

The identifier t corresponds to an attribute category. The attribute value of the attribute category corresponding to the identifier t is set in the vector $\vec{x}_t$. The attribute category is a classification of an attribute such as the affiliated department, sex, age, and so on. For example, if the identifier t corresponds to the affiliated department, a value representing the affiliated department of the user of the user secret key $sk_\Gamma$ is set in the vector $\vec{x}_t$.

In ciphertext policy-functional encryption, for each integer i of i=1, ..., L, a dispersion value $s_i$ of secret dispersion is assigned to the i-th row of the secret dispersion matrix M of the access structure S. For the i-th row of the secret dispersion matrix M, a cipher element $C_i$ in which the assigned dispersion value $s_i$ and the vector $\vec{x}_t$ are set is generated. A cipher element $C_0$ in which a secret value $s_0$ calculated from the set of dispersion value $S_i$ satisfying a condition is set is generated. A cipher element $c_{d+1}$ encrypted from a message m with using a session key K is generated. A ciphertext $ct_s$ including the cipher element $c_i$ for each integer i of i=0, ..., L, d+1 and the access structure S is generated.

The cipher element $c_i$ for each integer i of i=0, ..., L is a vector on the basis B whose subbasis B^ is included in the master public key mpk.

In the ciphertext-policy functional encryption, the key element $k^*_t$ for the identifier t included in the attribute set $\Gamma$ and the cipher element $c_i$ identified by a label $\rho(i)$ having the identifier t are pairing-operated. By the pairing operation, the inner product of the vector $\vec{v}_t$ and the vector $\vec{x}_t$ is calculated, and the map $\gamma(i)$ is calculated. Then, it is determined which row of the secret dispersion matrix M is to be included in the submatrix $M_\delta$.

If the access structure S accepts the attribute set $\Gamma$, a set of dispersion values $S_i$ satisfying the condition is extracted, and the secret value $s_0$ is calculated. The session key K is generated from a key element $k^*_0$, the cipher element $c_0$, and the secret value $s_0$. The message m is calculated with using the session key K.

FIG. 3 is an explanatory drawing of the secret value $s_0$ of secret dispersion.

The secret value so is the sum of elements of the product of a row vector whose r of elements are all 1 and a column vector f having r of elements $f_1, \ldots, f_r$. The elements of the row vector f are uniform random numbers.

FIG. 4 is an explanatory drawing of the dispersion values $s_1, \ldots, s_L$ of secret dispersion.

The dispersion values $s_1, \ldots, s_L$ are the products of the secret dispersion matrix M and the column vector f. A column vector $\vec{s}^T$ is a vector consisting of the dispersion values $s_1, \ldots, s_L$ as elements.

As described above, if the access structure M accepts the attribute set $\Gamma$, then the coefficient $\alpha_i$ satisfying $\Sigma_{i \in I} \alpha_i M_i = \vec{1}$ exists. The coefficient $\alpha_i$ can be computed in polynomial time in the size of the secret dispersion matrix M. Using the coefficient $\alpha_i$, $\Sigma_{i \in I} \alpha_i M_i = s_0$ is established from the definitions of the secret value $s_0$ and the dispersion values $s_1, \ldots, s_L$.

The outline of the technique for updating the master public key mpk and the master secret key msk will be described.

As described above, the master public key mpk includes the subbasis B^ of the basis B, and the master secret key msk includes the subbasis B^* of the basis B*. The cipher element $c_i$ included in the ciphertext $ct_s$ is a vector on the basis B, and a key element $k^*_i$ included in the user secret key $sk_\Gamma$ is a vector on the basis B*.

In this respect, in Embodiment 1, using a random matrix as updating information upk, the subbasis B^ included in the master public key mpk and the subbasis B^* included in the master secret key msk are updated with the updating information upk. Hence, the master public key mpk and master secret key msk are updated.

The basis B of the cipher element $c_i$ included in the ciphertext $ct_s$ and the basis B* of the key element $k^*_i$ included in the user secret key $sk_\Gamma$ are also updated with the updating information upk. Hence, the ciphertext $ct_s$ and the user secret key $sk_\Gamma$ are made to cope with update of the master public key mpk and master secret key msk.

*Description of Configuration*

Figure 5:
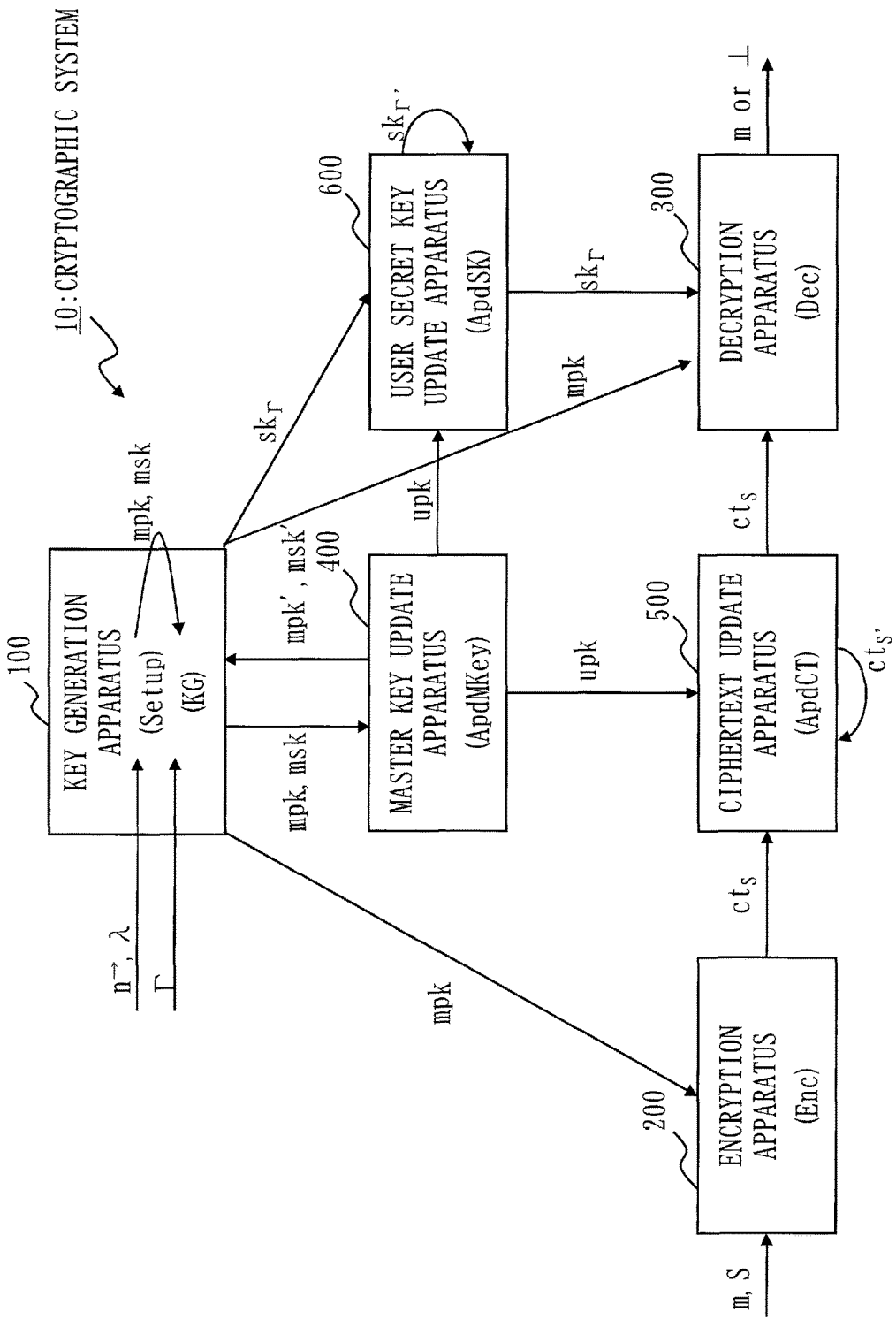
FIG. 5 is a configuration diagram of a cryptographic system 10 according to Embodiment 1.

FIG. 5 is a configuration diagram of a cryptographic system 10 according to Embodiment 1.

The cryptographic system 10 is provided with a key generation apparatus 100, an encryption apparatus 200, a decryption apparatus 300, a master key update apparatus 400, a ciphertext update apparatus 500, and a user secret key update apparatus 600.

The key generation apparatus 100 takes as input an attribute format $\vec{n}$ and a security parameter $\lambda$ and executes Setup algorithm, to generate the master public key mpk including the basis B and the master secret key msk including the basis B* which is different from the basis B included in the master public key mpk. The key generation apparatus 100 also takes as input the master public key mpk, the master secret key msk, and the user attribute set $\Gamma$ and executes KG algorithm, to generate the user secret key $sk_\Gamma$ including a key element being a vector on the basis B* included in the master secret key msk.

The key generation apparatus 100 publishes the master public key mpk. In response to a request from the master key update apparatus 400, the key generation apparatus 100 outputs the master secret key msk to the master key update apparatus 400 in secrecy. The key generation apparatus 100 also outputs the user secret key $sk_\Gamma$ to the user secret key update apparatus 600 in secrecy.

The encryption apparatus 200 takes as input the master public key mpk, the access structure S, and the message m and executes Enc algorithm, to generate the ciphertext $ct_s$ encrypted from the message m and including a cipher element being a vector on the basis B included in the master public key mpk. The encryption apparatus 200 outputs the ciphertext $ct_s$ to the ciphertext update apparatus 500.

The decryption apparatus 300 takes as input the master public key mpk, the user secret key $sk_\Gamma$, and the ciphertext $ct_s$ or an updated ciphertext $ct_{s'}$, executes Dec algorithm, and outputs the message m or a symbol ⊥ representing a decryption failure.

The master key update apparatus 400 takes as input the master public key mpk and the master secret key msk and executes ApdMKey algorithm, to generate a new master public key mpk', a new master secret key msk', and the updating information upk. More specifically, the master key update apparatus 400 updates the basis B included in the master public key mpk generated by the key generation apparatus 100, with the updating information upk, thereby generating the new master public key mpk'. The master key update apparatus 400 also updates the basis B* included in the master secret key msk generated by the key generation apparatus 100, with the updating information upk, thereby generating the new master secret key msk'.

The master key update apparatus 400 outputs the new master public key mpk' and the new master secret key msk' to the key generation apparatus 100 in secrecy and outputs the updating information upk to the ciphertext update apparatus 500 and the user secret key update apparatus 600 in secrecy.

The ciphertext update apparatus 500 stores the ciphertext $ct_s$ and outputs the ciphertext $ct_s$ to the decryption apparatus 300 in response to a request from the decryption apparatus 300.

When the new master public key mpk' and the new master secret key msk' are generated, the ciphertext update apparatus 500 takes the updating information upk and the ciphertext $ct_s$ as input and executes ApdCT algorithm, to generate the new ciphertext $ct_{s'}$ updated from the ciphertext $ct_s$. More specifically, the ciphertext update apparatus 500 updates a cipher element included in the ciphertext $ct_s$ generated by the encryption apparatus 200, with the updating information upk, thereby generating the new ciphertext $ct_{s'}$.

The ciphertext update apparatus 500 deletes the ciphertext $ct_s$ it manages, and stores the generated new ciphertext $ct_{s'}$ as the ciphertext $ct_s$.

The user secret key update apparatus 600 stores the user secret key $sk_\Gamma$ and outputs the stored user secret key $sk_\Gamma$ to the decryption apparatus 300 in secrecy.

The user secret key update apparatus 600 takes as input the updating information upk and the user secret key $sk_\Gamma$ and executes ApdSK algorithm, to generate a new user secret key $sk_{\Gamma'}$ updated from the user secret key $sk_\Gamma$. More specifically, the user secret key update apparatus 600 updates a key element included in the user secret key $sk_\Gamma$, with the updating information upk, thereby generating the new user secret key $sk_{\Gamma'}$.

The user secret key update apparatus 600 deletes the user secret key $sk_\Gamma$ it manages, and stores the generated new user secret key $sk_{\Gamma'}$ as the user secret key $sk_\Gamma$.

Figure 6:
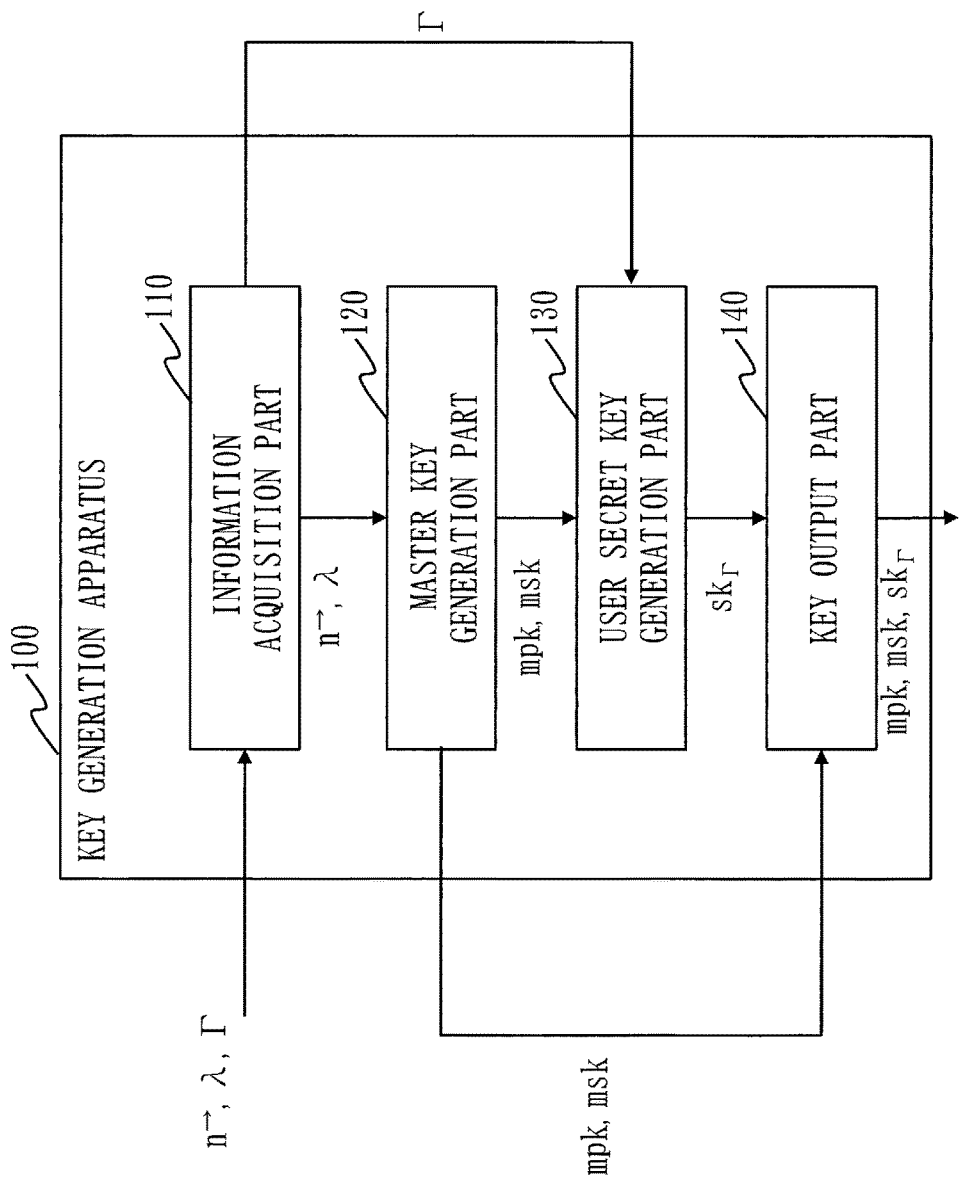
FIG. 6 is a configuration diagram of a key generation apparatus 100 according to Embodiment 1.

FIG. 6 is a configuration diagram of the key generation apparatus 100 according to Embodiment 1.

The key generation apparatus 100 is provided with an information acquisition part 110, a master key generation part 120, a user secret key generation part 130, and a key output part 140.

The information acquisition part 110 acquires the attribute format $\vec{n}$, security parameter λ, and attribute set Γ inputted by the administrator of the cryptographic system 10.

Based on the attribute format $\vec{n}$ and security parameter λ acquired by the information acquisition part 110, the master key generation part 120 generates the master public key mpk including the basis B and the master secret key msk including the basis B* which is different from the basis B included in the master public key mpk.

Based on the attribute set Γ acquired by the information acquisition part 110 and the master public key mpk and master secret key msk generated by the master key generation part 120, the user secret key generation part 130 generates the user secret key $sk_\Gamma$ including a key element being a vector on the basis B* included in the master secret key msk.

The key output part 140 outputs the master public key mpk to a publication server or the like so as to publish the master public key mpk, and outputs the user secret key $sk_\Gamma$ to the user secret key update apparatus 600 in secrecy. The key output part 140 also outputs the master secret key msk to the master key update apparatus 400 in secrecy.

To output in secrecy means, for example, to transmit through encryption in accordance with an existing cryptography.

Figure 7:
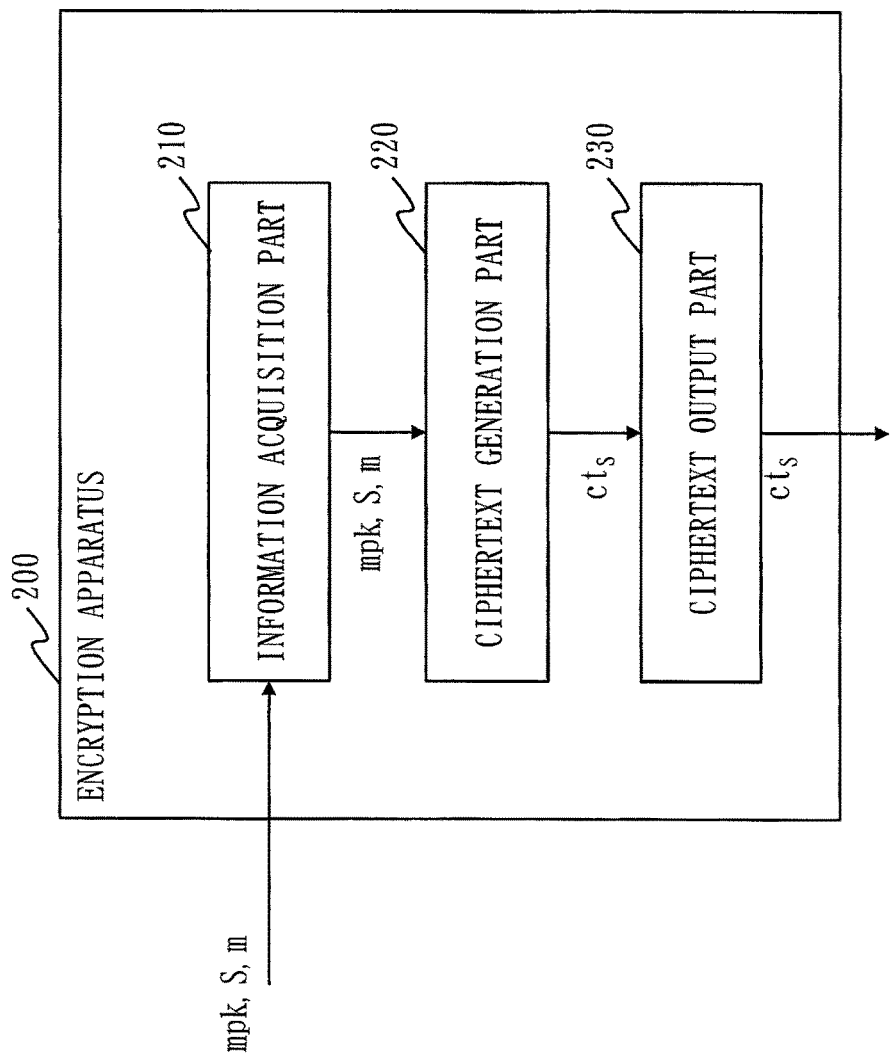
FIG. 7 is a configuration diagram of an encryption apparatus 200 according to Embodiment 1.

FIG. 7 is a configuration diagram of the encryption apparatus 200 according to Embodiment 1.

The encryption apparatus 200 is provided with an information acquisition part 210, a ciphertext generation part 220, and a ciphertext output part 230.

The information acquisition part 210 acquires the master public key mpk generated by the key generation apparatus 100, and the access structure S and message m inputted by the user of the encryption apparatus 200.

Based on the master public key mpk, access structure, S, and message m acquired by the information acquisition part 210, the ciphertext generation part 220 generates the ciphertext $ct_s$ encrypted from the message m and including a cipher element being a vector on the basis B included in the master public key mpk.

The ciphertext output part 230 outputs the ciphertext $ct_s$ generated by the ciphertext generation part 220 to the ciphertext update apparatus 500.

Figure 8:
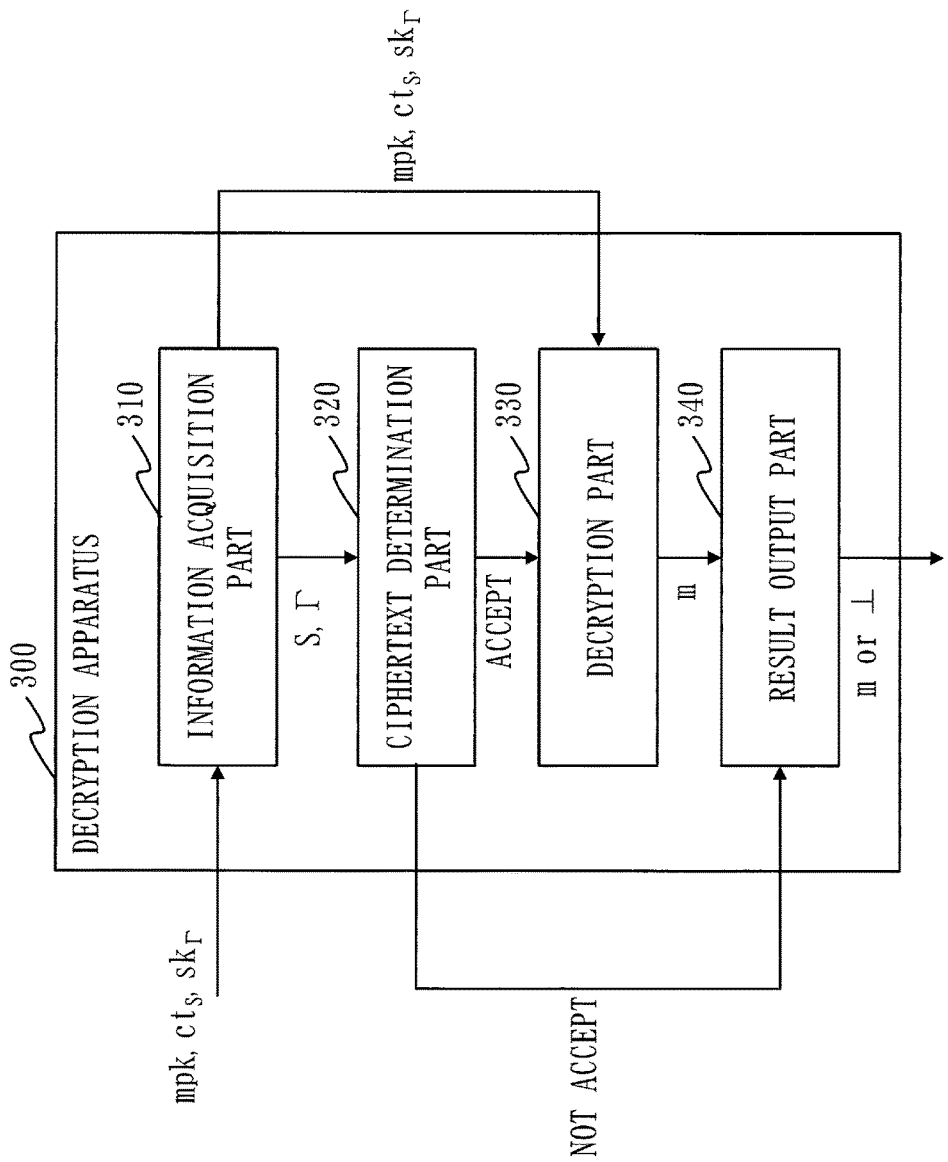
FIG. 8 is a configuration diagram of a decryption apparatus 300 according to Embodiment 1.

FIG. 8 is a configuration diagram of the decryption apparatus 300 according to Embodiment 1.

The decryption apparatus 300 is provided with an information acquisition part 310, a ciphertext determination part 320, a decryption part 330, and a result output part 340.

The information acquisition part 310 acquires the master public key mpk from the key generation apparatus 100, the ciphertext $ct_s$ from the ciphertext update apparatus 500, and the user secret key $sk_\Gamma$ from the user secret key update apparatus 600.

The ciphertext determination part 320 determines whether or not the ciphertext $ct_s$ acquired by the information acquisition part 310 is decryptable with using the user secret key $sk_\Gamma$.

If the ciphertext determination part 320 determines the ciphertext $ct_s$ as decryptable, the decryption part 330 decrypts the ciphertext acquired by the information acquisition part 310, with using the user secret key $sk_\Gamma$ based on the master public key mpk.

If the ciphertext determination part 320 determines the ciphertext as decryptable, the result output part 340 outputs the decryption result of the decryption part 330. If the ciphertext determination part 320 determines the ciphertext as not decryptable, the result output part 340 outputs the symbol ⊥ representing a decryption failure.

Figure 9:
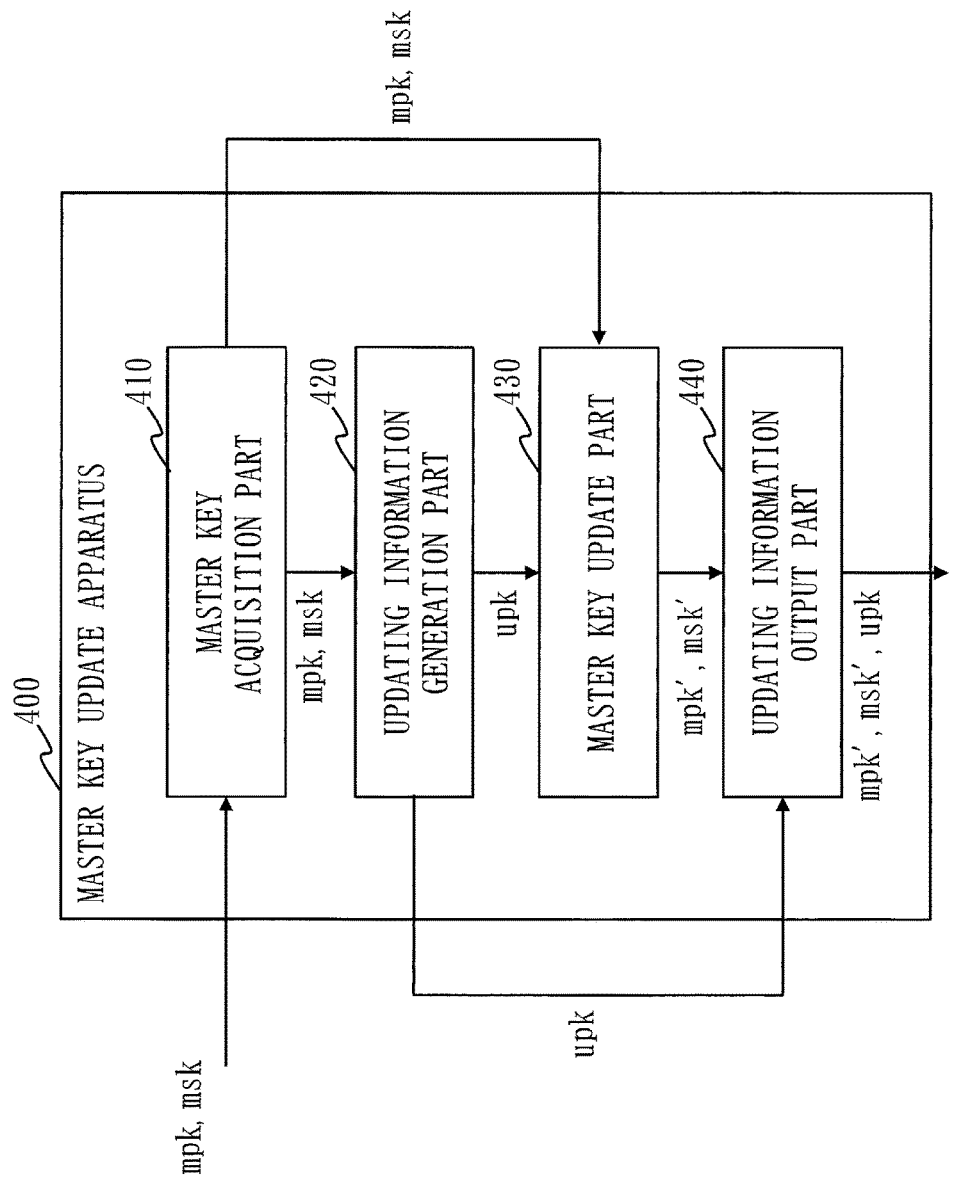
FIG. 9 is a configuration diagram of a master key update apparatus 400 according to Embodiment 1.

FIG. 9 is a configuration diagram of the master key update apparatus 400 according to Embodiment 1.

The master key update apparatus 400 is provided with a master key acquisition part 410, an updating information generation part 420, a master key update part 430, and an updating information output part 440.

The master key acquisition part 410 acquires the master public key mpk including the basis B and the master secret key msk including the basis B* which is different from the basis B included in the master public key mpk.

The updating information generation part 420 generates the updating information upk for updating the master public key mpk and master secret key msk.

The master key update part 430 updates the basis B included in the master public key mpk acquired by the master key acquisition part 410, with the updating information upk generated by the updating information generation part 420, to generate the new master public key mpk'. The master key update part 430 also updates the basis B* included in the master secret key msk acquired by the master key acquisition part 410, with the updating information upk generated by the updating information generation part 420, to generate the new master secret key msk'.

The updating information output part 440 outputs the new master public key mpk' and new master secret key msk' generated by the master key update part 430 to the key generation apparatus 100 in secrecy. The updating information output part 440 also outputs the updating information upk generated by the updating information generation part 420 to the ciphertext update apparatus 500 and user secret key update apparatus 600 in secrecy.

Figure 10:
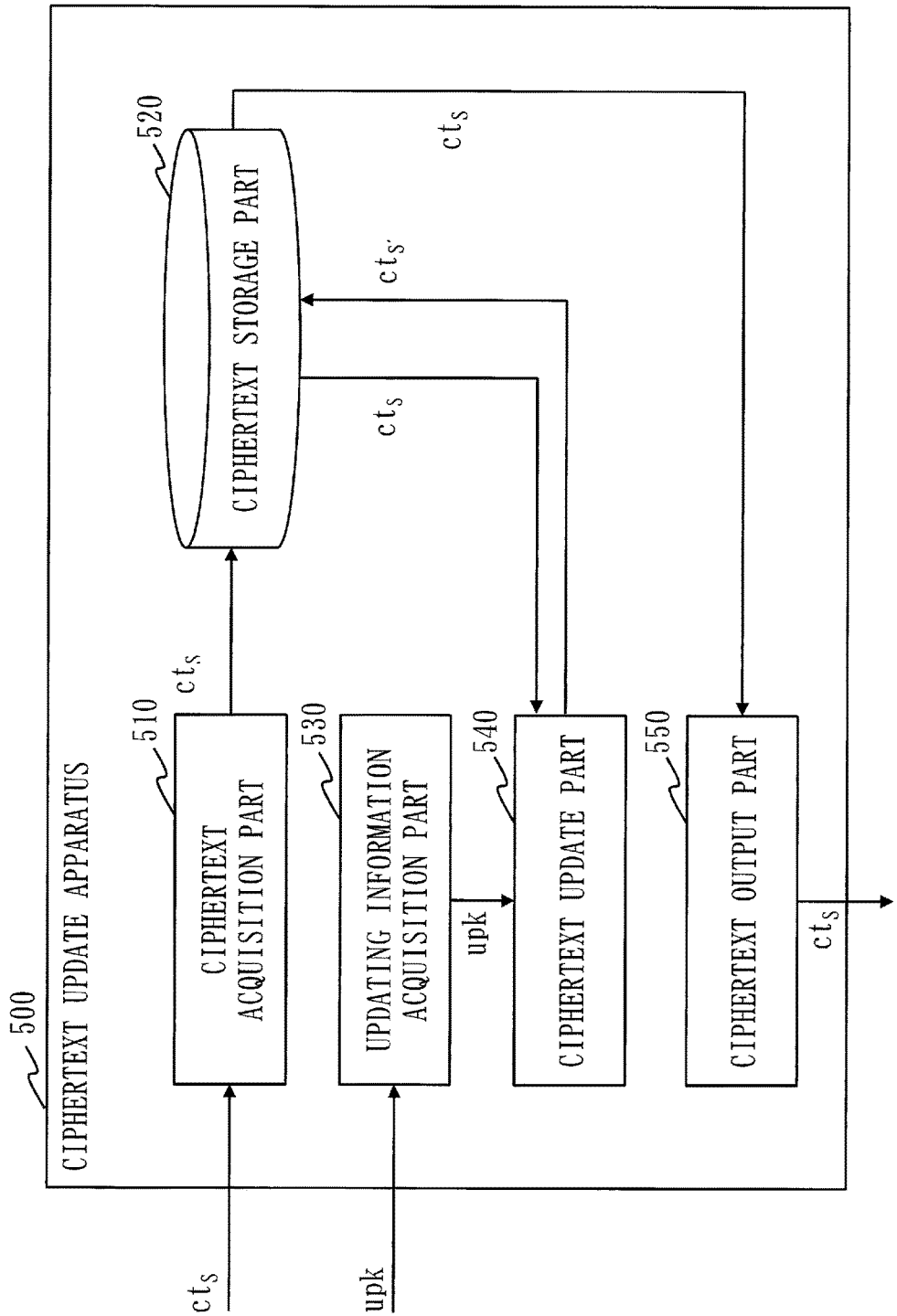
FIG. 10 is a configuration diagram of a ciphertext update apparatus 500 according to Embodiment 1.

FIG. 10 is a configuration diagram of the ciphertext update apparatus 500 according to Embodiment 1.

The ciphertext update apparatus 500 is provided with a ciphertext acquisition part 510, a ciphertext storage part 520, an updating information acquisition part 530, a ciphertext update part 540, and a ciphertext output part 550.

The ciphertext acquisition part 510 acquires the ciphertext $ct_s$ generated by the encryption apparatus 200.

The ciphertext storage part 520 is a storage device to store the ciphertext $ct_s$ acquired by the ciphertext acquisition part 510.

The updating information acquisition part 530 acquires the updating information upk generated by the master key update apparatus 400.

The ciphertext update part 540 updates a cipher element included in the ciphertext $ct_s$ generated by the encryption apparatus 200, with the updating information upk, to generate the new ciphertext $ct_{s'}$. More specifically, the ciphertext update apparatus 500 updates the cipher element included in the ciphertext $ct_s$ generated by the encryption apparatus 200, with the updating information upk, to generate the new ciphertext $ct_{s'}$.

The ciphertext update part 540 deletes the pre-update ciphertext $ct_s$ stored in the ciphertext storage part 520 and stores the generated new ciphertext $ct_{s'}$ as the ciphertext $ct_s$.

In response to the request from the decryption apparatus 300, the ciphertext output part 550 outputs the ciphertext $ct_s$ stored in the ciphertext storage part 520 to the decryption apparatus 300.

Figure 11:
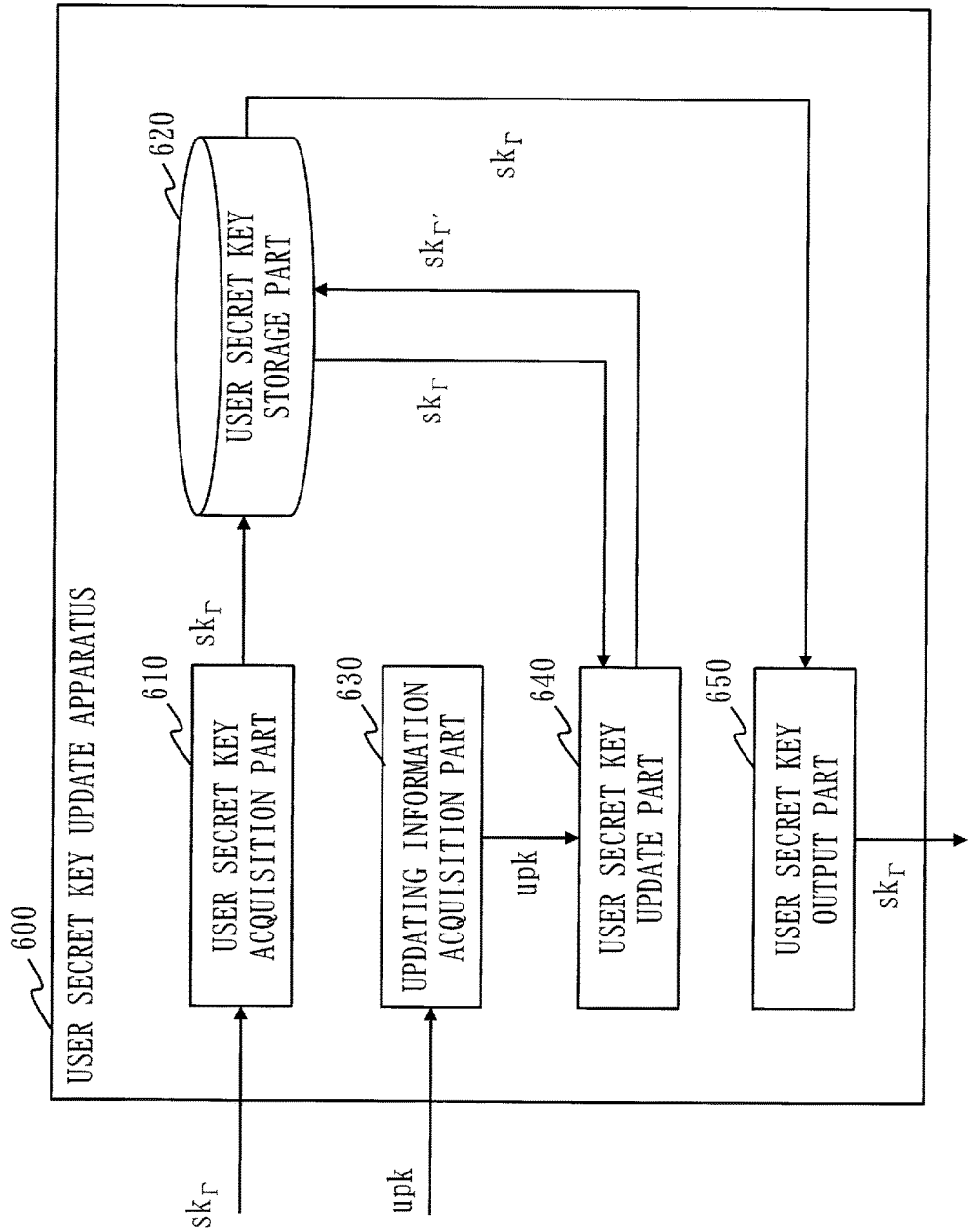
FIG. 11 is a configuration diagram of a user secret key update apparatus 600 according to Embodiment 1.

FIG. 11 is a configuration diagram of the user secret key update apparatus 600 according to Embodiment 1.

The user secret key update apparatus 600 is provided with a user secret key acquisition part 610, a user secret key storage part 620, an updating information acquisition part 630, a user secret key update part 640, and a user secret key output part 650.

The user secret key acquisition part 610 acquires the user secret key $sk_\Gamma$ generated by the key generation apparatus 100.

The user secret key storage part 620 is a storage device to store the user secret key $sk_\Gamma$ acquired by the user secret key acquisition part 610.

The updating information acquisition part 630 acquires the updating information upk generated by the master key update apparatus 400.

The user secret key update part 640 updates a key element included in the user secret key $sk_\Gamma$ with the updating information upk, to generate the new user secret key $sk_{\Gamma'}$. More specifically, the user secret key update apparatus 600 updates the key element included in the user secret key $sk_\Gamma$ with the updating information upk, to generate the new user secret key $sk_{\Gamma'}$.

The user secret key update part 640 deletes the pre-update user secret key $sk_\Gamma$ stored in the user secret key storage part 620, and stores the generated new user secret key $sk_{\Gamma'}$ as the user secret key $sk_\Gamma$.

The user secret key output part 650 outputs the user secret key $sk_\Gamma$ stored in the user secret key storage part 620 to the decryption apparatus 300 in secrecy when the user secret key acquisition part 610 acquires the user secret key $sk_\Gamma$ and when the user secret key update part 640 generates the new user secret key $sk_\Gamma$.

\*\*\*Description of Operation\*\*\*

Figure 12:
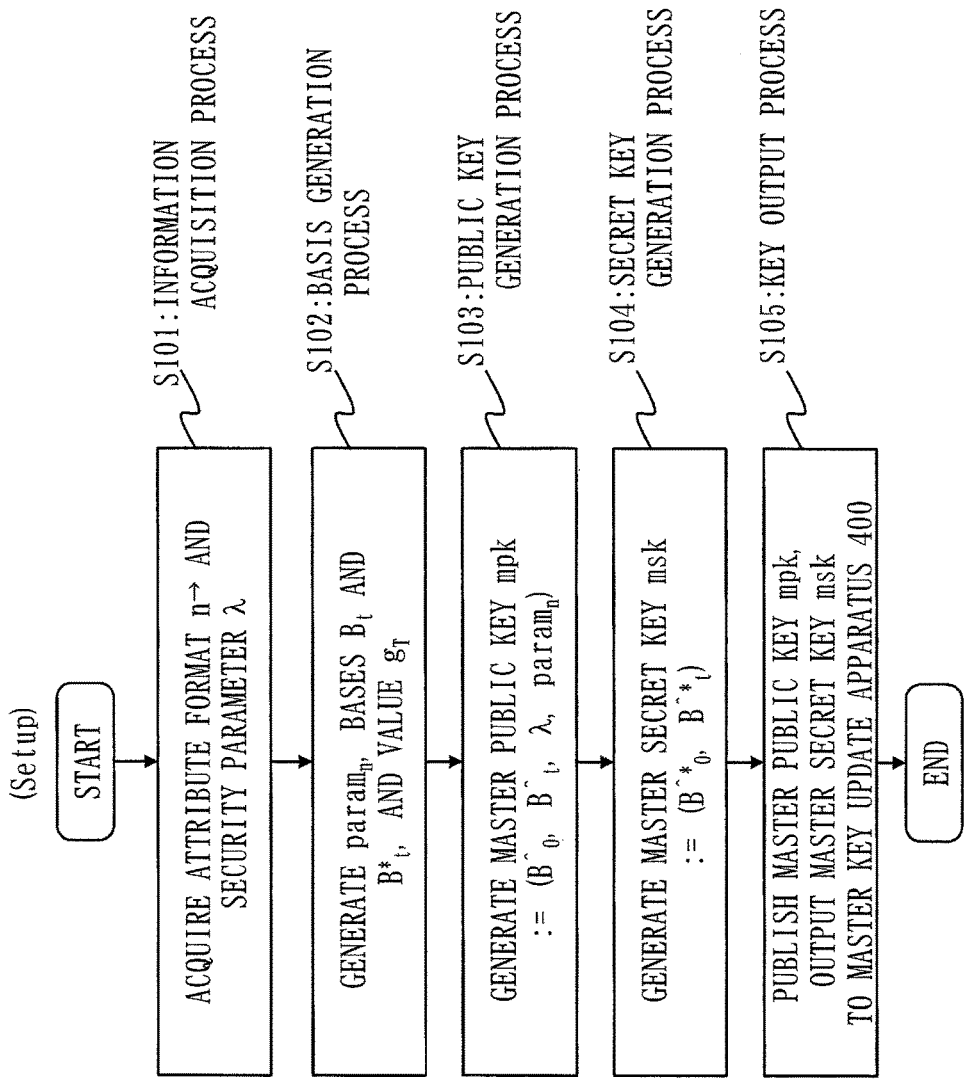
FIG. 12 is a flowchart of Setup algorithm according to Embodiment 1.

FIG. 12 is a flowchart of Setup algorithm according to Embodiment 1.

Setup algorithm is executed by the key generation apparatus 100.

(S101:Information Acquisition Process)

The information acquisition part 110 acquires the attribute format $\vec{n}:=(d; n_1, \ldots, n_d)$ and security parameter $\lambda$ inputted by the administrator or the like of the cryptographic system 10 with using the input apparatus.

(S102: Basis Generation Process)

The master key generation part 120 takes as input the attribute format $\vec{n}$ and security parameter $\lambda$ acquired in S101 and calculates Formula 113, to generate a parameter $param_n$ of dual pairing vector spaces, bases $B_t$ and $B^*_t$ for each integer t of t=0, . . . , d, and a value $g_T$.

[Formula 113]

$$\mathcal{G}_{ob}(1^\lambda, \vec{n} = (d; n_1, \ldots, n_d)):$$

$$param_\mathbb{G} := (q, \mathbb{G}, \mathbb{G}_T, g, e) \xleftarrow{R} \mathcal{G}_{bpg}(1^\lambda),$$

$$N_0 := 5, N_t := 3n_t + 1,$$

$$\psi \xleftarrow{U} \mathbb{F}_q^\times, g_T := e(g, g)^\psi,$$

$$\text{for } t = 0, \ldots, d,$$

$$param_{\mathbb{V}_t} := (q, \mathbb{V}_t, \mathbb{G}_T, \mathbb{A}_t, e) \xleftarrow{R} \mathcal{G}_{dpvs}(1^\lambda, N_t, param_\mathbb{G}),$$

$$X_t = \begin{pmatrix} \vec{\chi}_{t,1} \\ \vdots \\ \vec{\chi}_{t,N_t} \end{pmatrix} := (\chi_{t,i,j})_{i,j} \xleftarrow{U} GL(N_t, \mathbb{F}_q),$$

$$\begin{pmatrix} \vec{v}_{t,1} \\ \vdots \\ \vec{v}_{t,N_t} \end{pmatrix} := (v_{t,i,j})_{i,j} := \psi \cdot (X_t^T)^{-1},$$

$$b_{t,i} := \sum_{j=1}^{N_t} \chi_{t,i,j} a_{t,j}, \mathbb{B}_t := (b_{t,1}, \ldots, b_{t,N_t}),$$

$$b^*_{t,i} := \sum_{j=1}^{N_t} v_{t,i,j} a_{t,j}, \mathbb{B}^*_t := (b^*_{t,1}, \ldots, b^*_{t,N_t}),$$

-continued

[Formula 113]

$$param_n := \{param_{\mathbb{V}_t}\}_{t=0,\ldots,d},$$
$$return\ param_n, g_T, \{\mathbb{B}_t, \mathbb{B}_t^*\}_{t=0,\ldots,d}.$$

In Formula 113, $G_{bpg}$ is a function that generates bilinear pairing groups, and $G_{dpvs}$ is a function that generates dual pairing vector spaces.

(S103: Public Key Generation Process)

The master key generation part 120 generates a subbasis $\hat{\mathbb{B}}_0$ of a basis $\mathbb{B}_0$ generated in S102 and a subbasis $\hat{\mathbb{B}}_t$ for each integer t of t=1, ..., d, as indicated in Formula 114.

$$\hat{\mathbb{B}}_0 := (b_{0,1}, b_{0,2}, b_{0,5}),$$

$$\hat{\mathbb{B}}_t := (b_{t,1}, \ldots, b_{t,n_t}, b_{t,N_t})\ for\ t=1, \ldots, d \quad [\text{Formula 114}]$$

The master key generation part 120 puts together the subbasis $\hat{\mathbb{B}}_0$ and subbasis $\hat{\mathbb{B}}_t$, the security parameter λ inputted in S101, and $param_n$ generated in S102, and treats the result as the master public key mpk. Namely, for each integer t of t=1, ..., d, the master public key mpk includes the subbasis $\hat{\mathbb{B}}_t$ of the basis $\mathbb{B}_t$ transformed from a canonical basis A by the transformation matrix X.

(S104: Secret Key Generation Process)

The master key generation part 120 generates a subbasis $\hat{\mathbb{B}}_0^*$ of a basis $\mathbb{B}_0^*$ generated in S102 and a subbasis $\hat{\mathbb{B}}_t^*$ for each integer t of 1=1, ..., d, as indicated in Formula 115.

$$\hat{\mathbb{B}}_0^* := (b_{0,1}^*, b_{0,2}^*, b_{0,4}^*),$$

$$\hat{\mathbb{B}}_t^* := (b_{t,1}^*, \ldots, b_{t,n_t}^*, b_{t,2n_t+1}^*, \ldots, b_{t,3n_t}^*)\ for\ t=1, \ldots, d \quad [\text{Formula 115}]$$

The master key generation part 120 treats the subbasis $\hat{\mathbb{B}}_0^*$ and the subbasis $\hat{\mathbb{B}}_t^*$ as forming the master secret key msk. Namely, the master secret key msk includes the subbasis $\hat{\mathbb{B}}_t^*$ of the basis $\mathbb{B}_t^*$ transformed from the basis $\mathbb{B}_t$ by a transformation matrix $(X^T)^{-1}$ generated from the transformation matrix X, for each integer t of t=1, ..., d.

(S105: Key Output Process)

The key output part 140 outputs the master public key mpk generated in S103 to the publication server or the like, to publish the master public key mpk. The key output part 140 also outputs the master secret key msk to the master key update apparatus 400 in secrecy in response to the request from the master key update apparatus 400.

Figure 13:
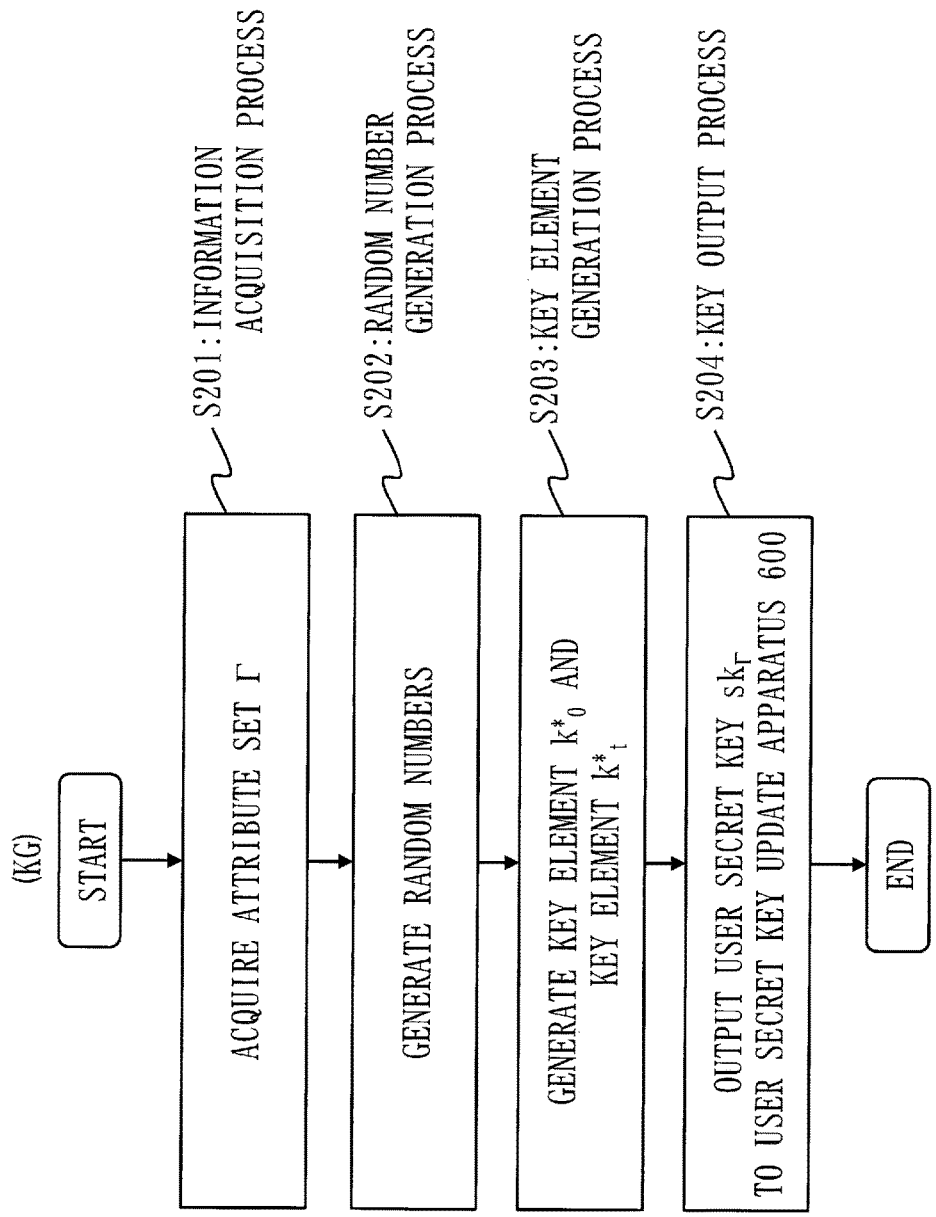
FIG. 13 is a flowchart of KG algorithm according to Embodiment 1.

FIG. 13 is a flowchart of KG algorithm according to Embodiment 1.

KG algorithm is executed by the key generation apparatus 100.

(S201: Information Acquisition Process)

The information acquisition part 110 acquires the user attribute set Γ inputted by the administrator or the like of the cryptographic system 10 with using the input apparatus.

The attribute set Γ is a tuple $(t, \vec{x}_t)$ of the identifier t and the vector $\vec{x}_t$. The identifier t corresponds to the attribute category. The attribute value of the attribute category corresponding to the identifier t is set in the vector $\vec{x}_t$.

(S202: Random Number Generation Process)

The user secret key generation part 130 generates random numbers as indicated in Formula 116.

$$\delta, \varphi_0 \xleftarrow{\cup} \mathbb{F}_q, \quad [\text{Formula 116}]$$

$$\vec{\varphi}_t \xleftarrow{\cup} \mathbb{F}_q^{n_t}\ for\ (t, \vec{x}_t) \in \Gamma$$

(S203: Key Element Generation Process)

Based on the attribute set Γ acquired in S201 and the random numbers generated in S202, the user secret key generation part 130 generates the key element $k_0^*$ and the key element $k_t^*$ which is for each identifier t included in the attribute set Γ, as indicated in Formula 117.

$$k_0^* := (1, \delta, 0, \varphi_0, 0)_{\mathbb{B}_0^*}, \quad [\text{Formula 117}]$$

$$k_t^* := (\overbrace{\delta \vec{x}_t}^{n_t}, \overbrace{0^{n_t}}^{n_t}, \overbrace{\vec{\varphi}_t}^{n_t}, \overbrace{0}^{1})_{\mathbb{B}_t^*}\ for\ (t, \vec{x}_t) \in \Gamma$$

As indicated in Formula 117, the key element $k_t^*$ for t=0 and for the identifier t included in the attribute set Γ is a vector on the basis $\mathbb{B}_t^*$.

(S204: Key Output Process)

The key output part 140 outputs the user secret key $sk_\Gamma$, including the attribute set Γ acquired in S201 and the key element $k_0^*$ and key element $k_t^*$ generated in S203, to the user secret key update apparatus 600 in secrecy, the key element $k_t^*$ being for each identifier t included in the attribute set Γ.

Figure 14:
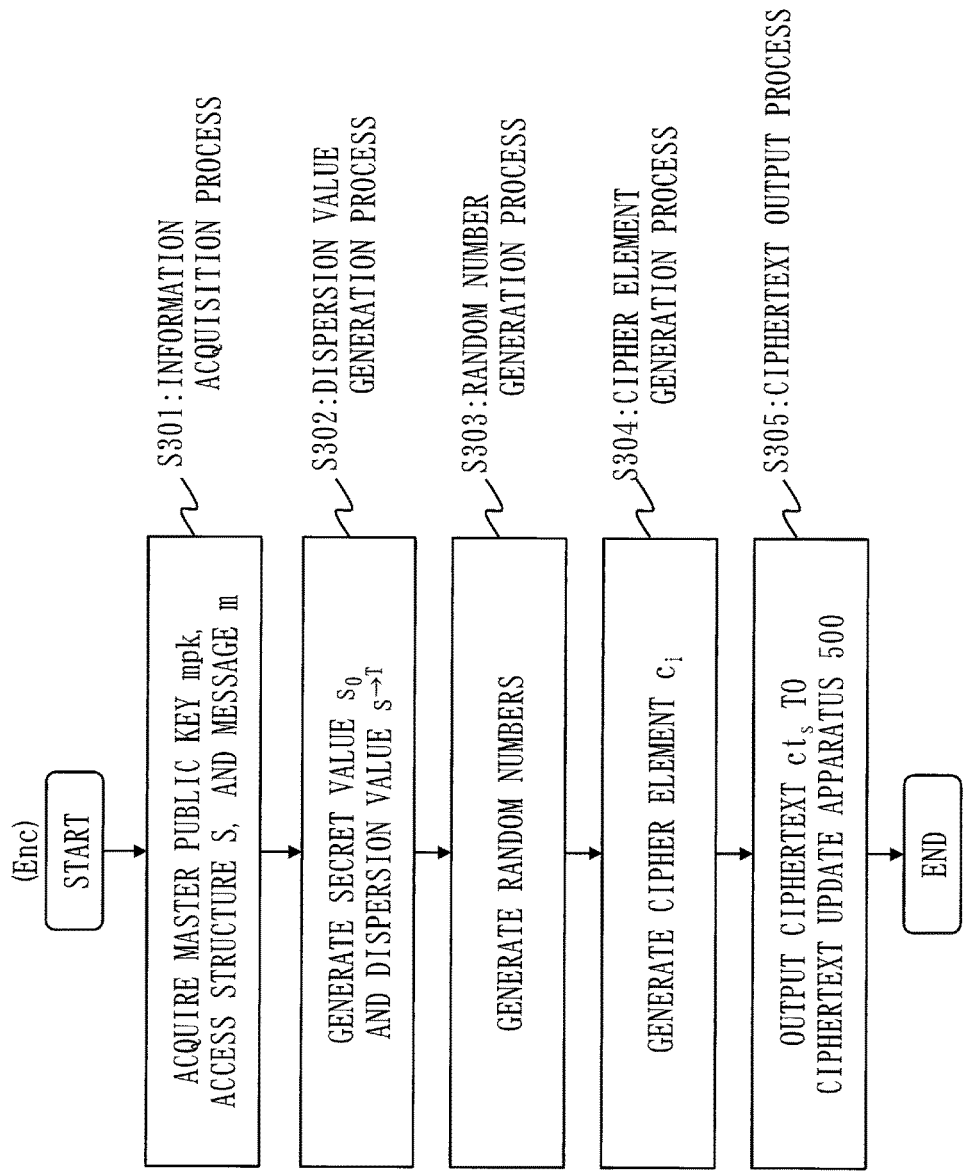
FIG. 14 is a flowchart of Enc algorithm according to Embodiment 1.

FIG. 14 is a flowchart of Enc algorithm according to Embodiment 1.

Enc algorithm is executed by the encryption apparatus 200.

(S301: Information Acquisition Process)

The information acquisition part 210 acquires the master public key mpk generated by the key generation apparatus 100, and the access structure S:=(M, ρ) and message m inputted by the user of the encryption apparatus 200 with using the input apparatus.

In the access structure S, a ciphertext $ct_s$-decryptable range has been set.

(S302: Dispersion Value Generation Process)

The ciphertext generation part 220 generates the secret value $s_0$ and the dispersion value $\vec{s}^T$, as indicated in Formula 118.

$$\vec{f} \xleftarrow{\cup} \mathbb{F}_q^r, \quad [\text{Formula 118}]$$

$$\vec{s}^T := (s_1, \ldots, s_L)^T := M \cdot \vec{f}^T,$$

$$s_0 := \vec{1} \cdot \vec{f}^T$$

(S303: Random Number Generation Process)

The ciphertext generation part 220 generates random numbers as indicated in Formula 119.

$$\eta_0, \zeta \xleftarrow{\cup} \mathbb{F}_q, \quad [\text{Formula 119}]$$

$$\theta_i, \eta_i \xleftarrow{\cup} \mathbb{F}_q\ for\ i = 1, \ldots, L$$

(S304: Cipher Element Generation Process)

The ciphertext generation part 220 generates the cipher element $c_i$ for each integer i of i=0, ..., L, d+1, as indicated in Formula 120.

$$c_0 := (\zeta, -s_0, 0, 0, \eta_0)_{\mathbb{B}_0}, \qquad \text{[Formula 120]}$$

for $i = 1, \ldots, L$, if $\rho(i) = (t, \vec{v}_i)$, $$c_i := (s_i \vec{e}_{t,1} + \theta_i \vec{v}_t, \overbrace{0^{n_t}}^{n_t}, \overbrace{0^{n_t}}^{n_t}, \overbrace{\eta_i}^{1})_{\mathbb{B}_t},$$

if $\rho(i) = \neg(t, \vec{v}_i)$, $$c_i := (s_i \vec{v}_t, \overbrace{0^{n_t}}^{n_t}, \overbrace{0^{n_t}}^{n_t}, \overbrace{\eta_i}^{1})_{\mathbb{B}_t},$$

$$c_{d+1} := m \cdot g_T^{\zeta}$$

As indicated in Formula 120, the cipher element $c_i$ for each integer i of i=0, ..., L is a vector on the basis $\mathbb{B}_t$.

(S305: Ciphertext Output Process)

The ciphertext output part 230 outputs the ciphertext $ct_s$, including the access structure S acquired in S301 and the cipher element $c_i$ generated in S304 for each integer i of i=0, ..., d+1, to the ciphertext update apparatus 500.

Figure 15:
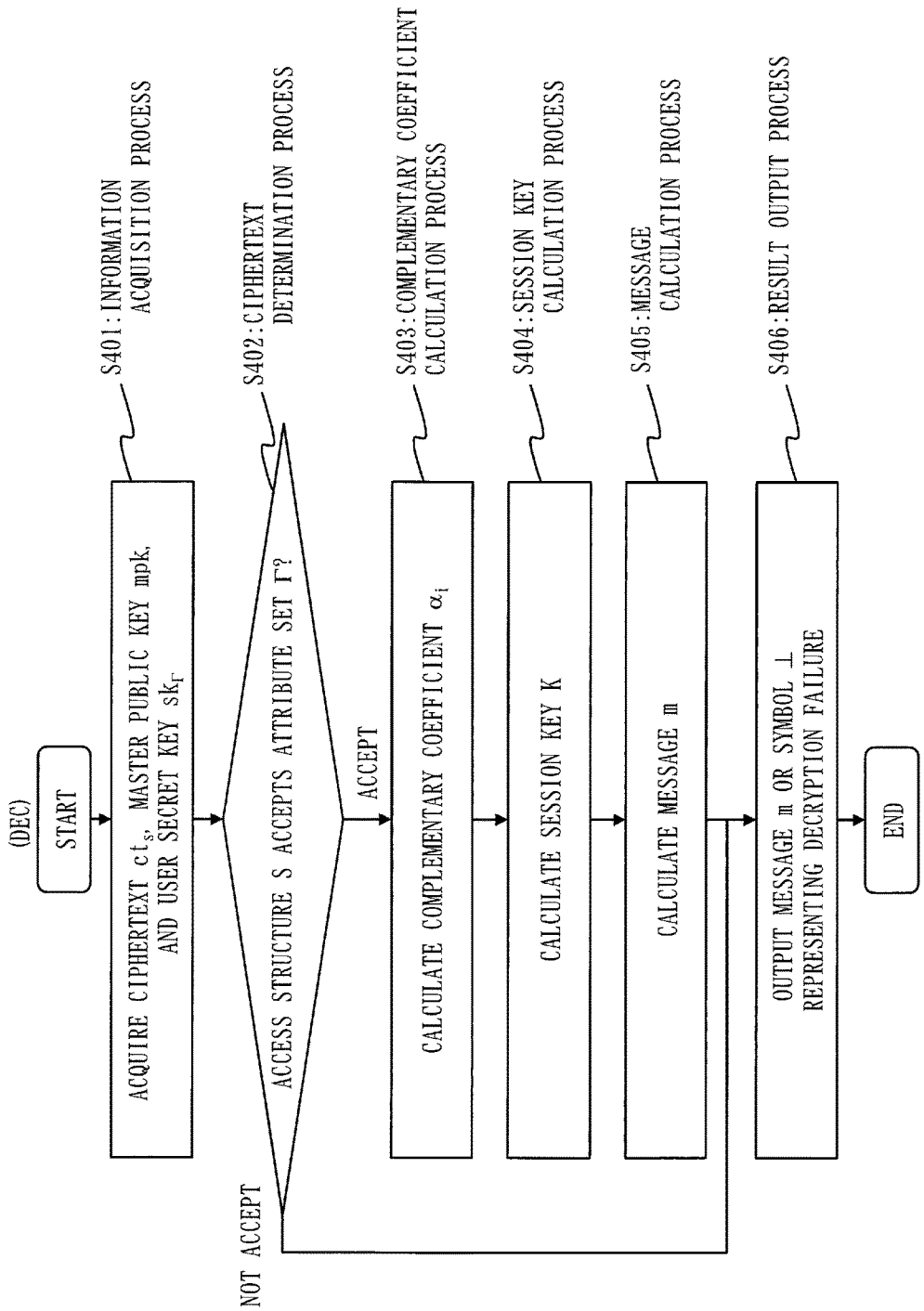
FIG. 15 is a flowchart of Dec algorithm according to Embodiment 1.

FIG. 15 is a flowchart of Dec algorithm according to Embodiment 1.

Dec algorithm is executed by the decryption apparatus 300.

(S401: Information Acquisition Process)

The information acquisition part 310 outputs a request to the ciphertext update apparatus 500 to acquire the ciphertext $ct_s$ from the ciphertext update apparatus 500. The information acquisition part 310 acquires the user secret key $sk_\Gamma$ from the user secret key update apparatus 600. The information acquisition part 310 acquires the master public key mpk generated by the key generation apparatus 100.

(S402: Ciphertext Determination Process)

The ciphertext determination part 320 determines whether or not the access structure S included in the ciphertext $ct_s$ acquired in S401 accepts the attribute set $\Gamma$ included in the user secret key $sk_\Gamma$ acquired in S401.

If it is determined that the access structure S accepts the attribute set $\Gamma$, the ciphertext determination part 320 advances the process to S403. If it is determined that the access structure S does not accept the attribute set $\Gamma$, the ciphertext determination part 320 advances the process to S406.

(S403: Complementary Coefficient Calculation Process)

The decryption part 330 calculates the set I of row numbers and a complementary coefficient $\{\alpha_i\}_{i \in I}$ satisfying Formula 121.

$$\vec{1} = \sum_{i \in I} \alpha_i M_i \qquad \text{[Formula 121]}$$

where $M_i$ is the i-th row of M, and $I \subseteq \{i \in \{1, \ldots, L\} | [\rho(i) = (t, \vec{v}_i) \wedge (t, \vec{x}_t) \in \Gamma \wedge \vec{v}_i \cdot \vec{x}_t = 0]$
$\vee [\rho(i) = \neg(t, \vec{v}_i) \wedge (t, \vec{x}_t) \in \Gamma \wedge \vec{v}_i \cdot \vec{x}_t \neq 0]\}$ (S404: Session Key Calculation Process)

The decryption part 330 calculates Formula 122 based on the ciphertext $ct_s$ and user secret key $sk_\Gamma$ acquired in S401 and the set I and complementary coefficient $\{\alpha_i\}_{i \in I}$ calculated in S403, to calculate the session key K.

$$K := e(c_0, k_0^*) \cdot \qquad \text{[Formula 122]}$$
$$\prod_{i \in I \wedge \rho(i) = (t, \vec{v}_i)} e(c_i, k_t^*)^{\alpha_i} \cdot \prod_{i \in I \wedge \rho(i) = \neg(t, \vec{v}_i)} e(c_i, k_t^*)^{\alpha_i/(\vec{v}_i \cdot \vec{x}_t)}$$

(S405: Message Calculation Process)

The decryption part 330 calculates the message m by dividing a cipher element $C_{d+1}$ included in the ciphertext $ct_s$ by the session key K calculated in S404.

(S406: Result Output Process)

If it is determined in S402 that the access structure S accepts the attribute set $\Gamma$, the result output part 340 outputs the message m calculated in S405. If it is determined in S402 that the access structure S does not accept the attribute set $\Gamma$, the result output part 340 outputs the symbol $\perp$ representing a decryption failure.

Figure 16:
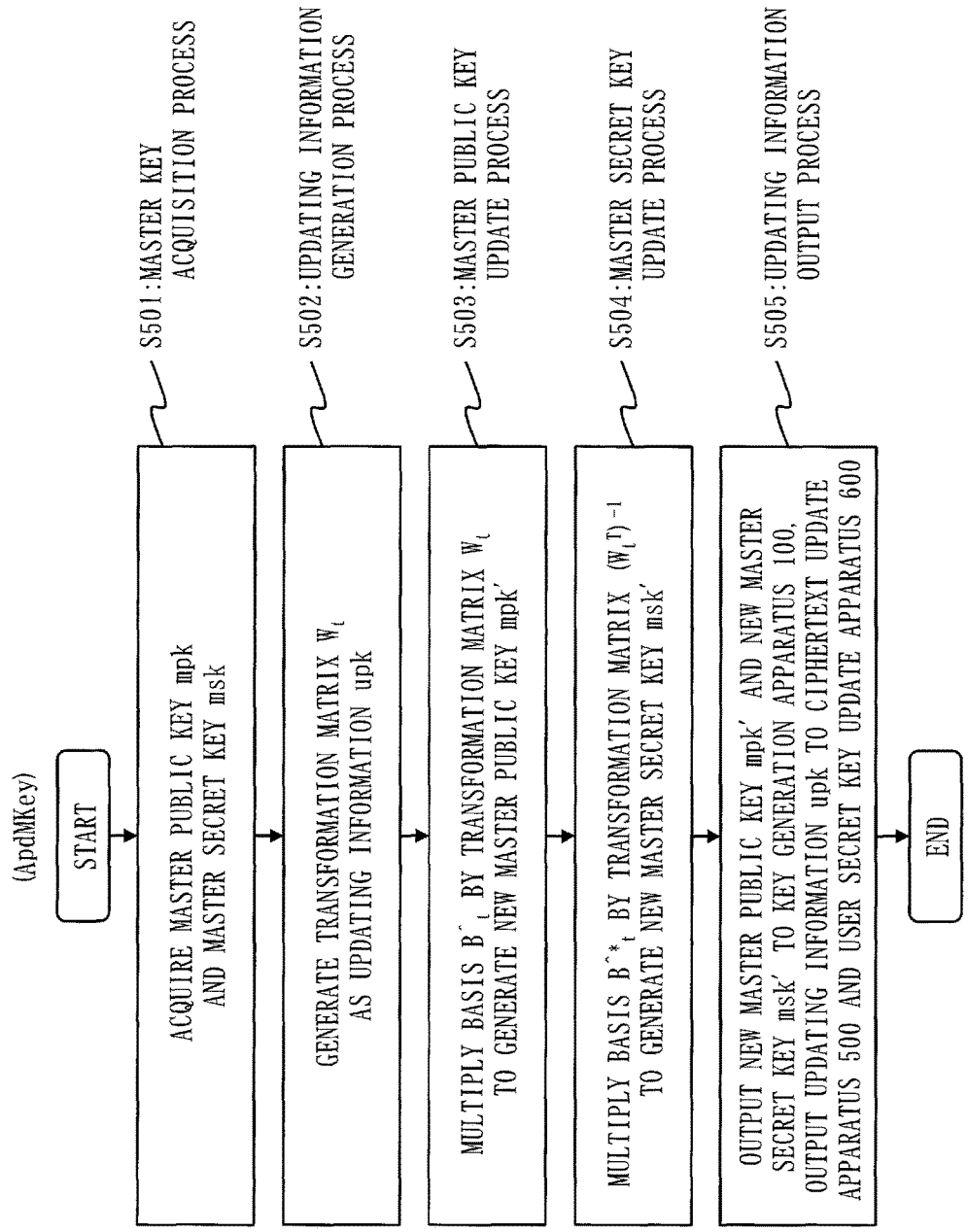
FIG. 16 is a flowchart of ApdMKey algorithm according to Embodiment 1.

FIG. 16 is a flowchart of ApdMKey algorithm according to Embodiment 1.

ApdMPey algorithm is executed by the master key update apparatus 400.

(S501: Master Key Acquisition Process)

The master key acquisition part 410 acquires the currently employed master public key mpk and master secret key msk which are generated by the key generation apparatus 100.

(S502: Updating Information Generation Process)

For each integer t of t=0, ..., d, the updating information generation part 420 generates a transformation matrix $W_t$ as the updating information upk, as indicated in Formula 123.

$$W_0 \xleftarrow{U} GL(N_0, \mathbb{F}_q), \qquad \text{[Formula 123]}$$
$$W_t \xleftarrow{U} GL(N_t, \mathbb{F}_q) t = 1, \ldots, d$$

(S503: Master Public key Update Process)

For each integer t of t=0, ..., d, the master key update part 430 multiplies the subbasis $\hat{\mathbb{B}}_t$ of the master public key mpk acquired in S501 by the transformation matrix $W_t$ of the updating information upk generated in S502, to update the subbasis $\hat{\mathbb{B}}_t$ of the basis $\mathbb{B}_t$, thereby generating a new subbasis $\hat{\mathbb{B}}'_t$, as indicated in Formula 124.

$$\hat{\mathbb{B}}'_t := \hat{\mathbb{B}}_t W_t \text{ for } t=0, \ldots d \qquad \text{[Formula 124]}$$

The master key update part 430 substitutes the new subbasis $\hat{\mathbb{B}}'^*_t$ for the subbasis $\hat{\mathbb{B}}_t$ of the master public key mpk acquired in S501, to generate the new master public key mpk'.

(S504: Master Secret Key Update Process)

For each integer t of t=0, ..., d, the master key update part 430 multiplies the subbasis $\hat{\mathbb{B}}^*_t$ of the master secret key msk acquired in S501 by a transformation matrix $(W_t^T)^{-1}$ transformed from the transformation matrix $W_t$ of the updating information upk generated in S502, to update the subbasis $\hat{\mathbb{B}}^*_t$ of the basis $\mathbb{B}^*_t$, thereby generating a new subbasis $\hat{\mathbb{B}}'^*_t$, as indicated in Formula 125.

$$\hat{B}'^*_t := \hat{B}^*_t (W_t^T)^{-1} \text{ for } t=0, \ldots, d \qquad \text{[Formula 125]}$$

The master key update part 430 substitutes the new subbasis $\hat{\mathbb{B}}'^*_t$ for the subbasis $\hat{\mathbb{B}}^*_t$ of the master public key mpk acquired in S501, to generate the new master secret key msk'.

(S505: Updating Information Output Process)

The updating information output part 440 outputs the new master public key mpk' generated in S503 and the new master secret key msk' generated in S504 to the key generation apparatus 100 in secrecy. The updating information output part 440 also outputs the updating information upk generated in S502 to the ciphertext update apparatus 500 and user secret key update apparatus 600 in secrecy.

Figure 17:
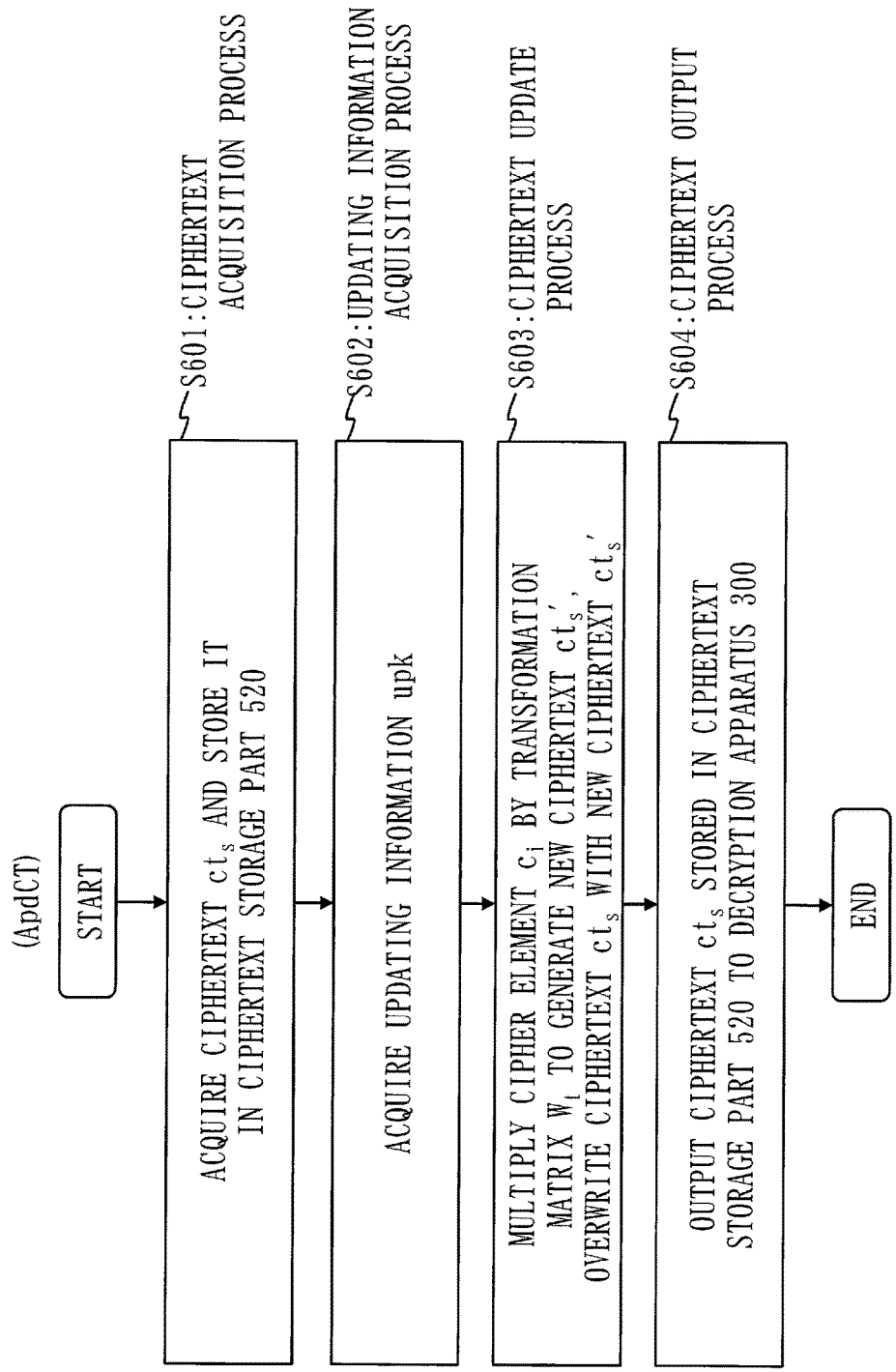
FIG. 17 is a flowchart of ApdCT algorithm according to Embodiment 1.

FIG. 17 is a flowchart of ApdCT algorithm according to Embodiment 1.

ApdCT algorithm is executed by the ciphertext update apparatus 500.

(S601: Ciphertext Acquisition Process)

The ciphertext acquisition part 510 acquires the ciphertext $ct_s$ generated by the encryption apparatus 200. The ciphertext acquisition part 510 stores in the ciphertext storage part 520 the acquired ciphertext $ct_s$.

(S602: Updating Information Acquisition Process)

The updating information acquisition part 530 acquires the updating information upk generated by the master key update apparatus 400.

(S603: Ciphertext Update Process)

For each integer i of i=0, . . . L, the ciphertext update part 540 multiplies the cipher element $c_i$ included in the ciphertext $ct_s$ stored in the ciphertext storage part 520 by the transformation matrix $W_t$ of the updating information upk acquired in S602, to generate a new cipher element $c_i'$, as indicated in Formula 126.

$$c'_0 := c_0 W_0,$$

$$c'_i := c_i W_t \; \rho(i)=(t, \vec{v}_i) \text{ or } \rho(i)=\neg(t, \vec{v}_i) \quad \text{[Formula 126]}$$

The ciphertext update part 540 deletes the pre-update ciphertext $ct_s$ stored in the ciphertext storage part 520 and stores in the ciphertext storage part 520 the new ciphertext $ct_{s'}$ in which the cipher element $c_i$ is replaced by the new cipher element $c_i'$, as the ciphertext $ct_s$.

(S604: Ciphertext Output Process)

In response from the request from the decryption apparatus 300, the ciphertext output part 550 outputs the ciphertext $ct_s$ stored in the ciphertext storage part 520 to the decryption apparatus 300.

Figure 18:
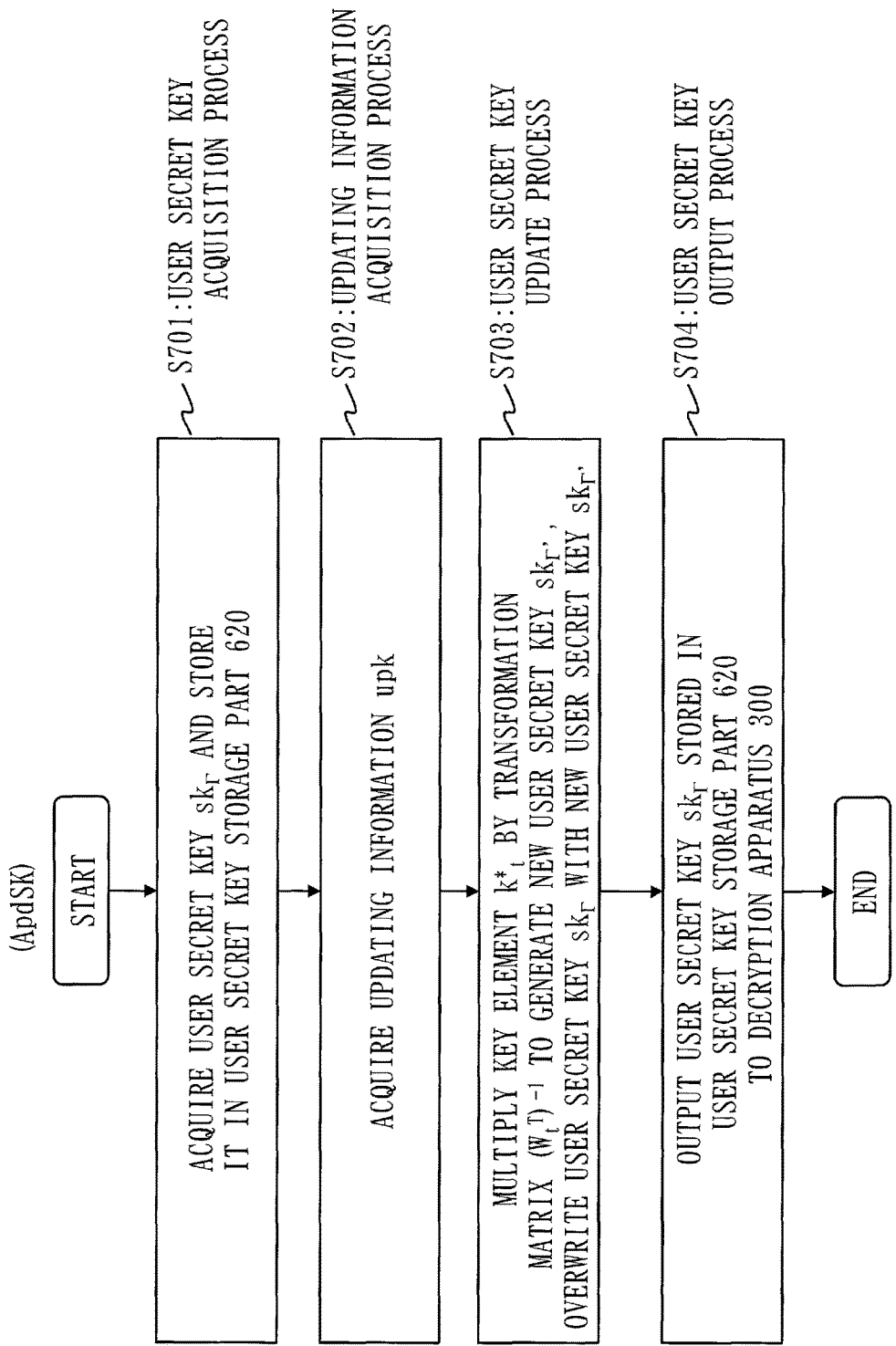
FIG. 18 is a flowchart of ApdSK algorithm according to Embodiment 1.

FIG. 18 is a flowchart of ApdSK algorithm according to Embodiment 1.

ApdSK algorithm is executed by the user secret key update apparatus 600.

(S701: User Secret Key Acquisition Process)

The user secret key acquisition part 610 acquires the user secret key $sk_\Gamma$ generated by the key generation apparatus 100. The user secret key acquisition part 610 stores in the user secret key storage part 620 the acquired user secret key $sk_\Gamma$.

(S702: Updating Information Acquisition Process)

The updating information acquisition part 630 acquires the updating information upk generated by the master key update apparatus 400.

(S703: User Secret Key Update Process)

For t=0 and each identifier t included in the attribute set Γ, the user secret key update part 640 multiplies the key element $k^*_t$ included in the user secret key $sk_\Gamma$ stored in the user secret key storage part 620 by the transformation matrix $(W_t^T)^{-1}$ transformed from the transformation matrix $W_t$ of the updating information upk acquired in S702, to update the key element $k^*_t$, thereby generating a new key element $k'^*_t$, as indicated in Formula 127.

$$k'^*_0 := k^*_0 (W_0^T)^{-1},$$

$$k'^*_t := k^*_t (W_t^T)^{-1} \text{ for } (t, \vec{x}_t) \in \Gamma \quad \text{[Formula 127]}$$

The user secret key update part 640 deletes the pre-update user secret key $sk_\Gamma$ stored in the user secret key storage part 620, and stores in the user secret key storage part 620 the new secret key $sk_\Gamma'$ in which the new key element $k'^*_t$ replaces the key element $k^*_t$, as the user secret key $sk_\Gamma$.

(S704: User Secret Key Output Process)

The user secret key output part 650 outputs the user secret key $sk_\Gamma'$ stored in the user secret key storage part 620 to the decryption apparatus 300.

*Effect of Invention*

As described above, in the cryptographic system 10 according to Embodiment 1, the ciphertext update apparatus 500 updates the ciphertext $ct_s$ with using the updating information upk employed when updating the master public key mpk and master secret key msk, so that the ciphertext $ct_s$ can cope with the updated master public key mpk and master secret key msk.

Therefore, in the cryptographic system 10 according to Embodiment 1, when the master public key mpk and master secret key msk are updated, it is not necessary to temporarily decrypt and then encrypt the ciphertext $ct_s$. Hence, there is no risk of information leakage resulting from temporarily decrypting the ciphertext $ct_s$. Also, a high-load process of temporarily decrypting and then encrypting the ciphertext $ct_s$ need not be executed.

Likewise, in the cryptographic system 10 according to Embodiment 1, the user secret key update apparatus 600 updates the user secret key $sk_\Gamma$ with using the updating information upk employed when updating the master public key mpk and master secret key msk, so that the user secret key $sk_\Gamma$ can cope with the updated master public key mpk and master secret key msk.

Therefore, in the cryptographic system 10 according to Embodiment 1, when the master public key mpk and master secret key msk are updated, it is not necessary to regenerate the user secret key $sk_\Gamma$ based on the updated master secret key msk. Hence, a high-load process of generating the user secret key $sk_\Gamma$ need not be executed.

In the above description, the key generation apparatus 100, master key update apparatus 400, ciphertext update apparatus 500, and user secret key update apparatus 600 are different apparatuses. This does not necessarily mean that the key generation apparatus 100, master key update apparatus 400, ciphertext update apparatus 500, and user secret key update apparatus 600 must be accommodated in separate housings. Two or more out of the key generation apparatus 100, master key update apparatus 400, ciphertext update apparatus 500, and user secret key update apparatus 600 may be accommodated in one housing to constitute one apparatus.

In the above description, a method of updating the master public key mpk, master secret key msk, ciphertext $ct_s$, and user secret key $sk_\Gamma$ in ciphertext-policy functional encryption has been described.

The updating method described above is a method of transforming the bases of the master public key mpk, master secret key msk, ciphertext $ct_s$, and user secret key $sk_\Gamma$. Thus, the updating method described above can be applied to key-policy functional encryption by changing it only formally.

Figure 19:
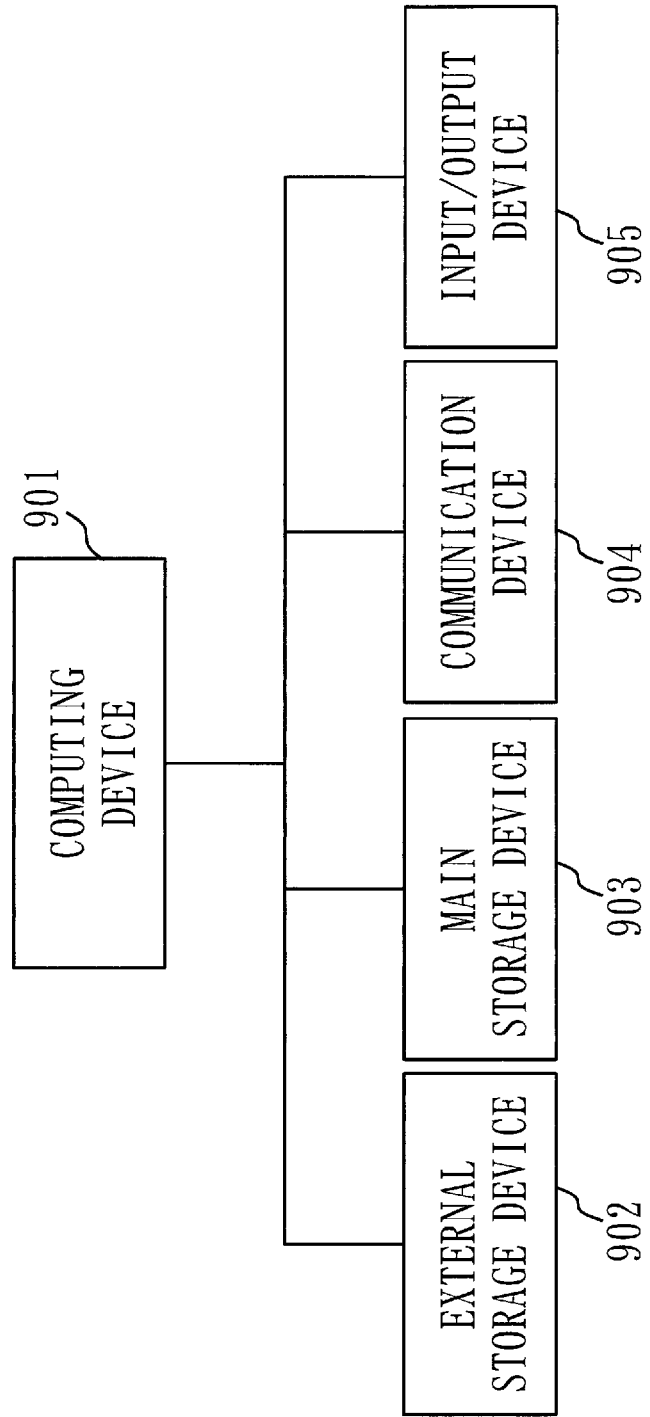
FIG. 19 is a diagram illustrating an example of a hardware configuration of each of the key generation apparatus 100, encryption apparatus 200, decryption apparatus 300, master key update apparatus 400, ciphertext update apparatus 500, and user secret key update apparatus 600 indicated in Embodiment 1.

FIG. 19 is a diagram illustrating an example of a hardware configuration of each of the key generation apparatus 100, encryption apparatus 200, decryption apparatus 300, master key update apparatus 400, ciphertext update apparatus 500, and user secret key update apparatus 600 indicated in Embodiment 1.

Each apparatus is a computer. A data display program can be configured by implementing each element of each apparatus as a program.

Each apparatus has a hardware configuration in which a computing device 901, an external storage device 902, a main storage device 903, a communication device 904, and an input/output device 905 are connected to a bus.

The computing device 901 is a CPU (Central Processing Unit) or the like which executes a program. The external storage device 902 is, for example, a ROM (Read Only Memory), a flash memory, a hard disk device, or the like. The main storage device 903 is, for example, a RAM (Random Access Memory) or the like. The communication device 904 is, for example, a communication board or the like. The input/output device 905 is, for example, a mouse, a keyboard, a display device, or the like.

Programs are normally stored in the external storage device 902. The programs are loaded to the main storage device 903 and are sequentially read and executed by the computing device 901.

Each program is a program that implements a function explained as a "part".

Furthermore, the external storage device 902 stores an operating system (OS) as well. The OS is loaded to the main storage device 903 at least partly. The computing device 901 executes the program while executing the OS.

In the description of Embodiment 1, information and so on that are described as being acquired, generated, outputted, and so on by a "part" are stored as files in the main storage device 903.

The configuration of FIG. 19 merely illustrates an example of the hardware configuration of each apparatus. The hardware configuration of each apparatus is not limited to the configuration illustrated in FIG. 19. Each apparatus may have another hardware configuration.

REFERENCE SIGNS LIST

10: cryptographic system; 100: key generation apparatus; 110: information acquisition part; 120: master key generation part; 130: user secret key generation part; 140: key output part; 200: encryption apparatus; 210: information acquisition part; 220: ciphertext generation part; 230: ciphertext output part; 300: decryption apparatus; 310: information acquisition part; 320: ciphertext determination part; 330: decryption part; 340: result output part; 400: master key update apparatus; 410: master key acquisition part; 420: updating information generation part; 430: master key update part; 440: updating information output part; 500: ciphertext update apparatus; 510: ciphertext acquisition part; 520: ciphertext storage part; 530: updating information acquisition part; 540: ciphertext update part; 550: ciphertext output part; 600: user secret key update apparatus; 610: user secret key acquisition part; 620: user secret key storage part; 630: updating information acquisition part; 640: user secret key update part; 650: user secret key output part; A: canonical basis; B, B*: basis; B^, B^*: subbasis; msk: master secret key; mpk: master public key; Γ: attribute set; S: access structure; m: message; $sk_\Gamma$: user secret key; $sk_{\Gamma'}$: new user secret key; $ct_S$: ciphertext; $ct_{S'}$: new ciphertext; upk: updating information; t: identifier; $k^*_t$: key element; $c_i$: cipher element; X, W: transformation matrix.

The invention claimed is:

1. A cryptographic system comprising
a master key update apparatus including
a computer processor, and
a memory storing instructions which, when executed by the computer processor, performs a process including,
acquiring a master public key that includes a subbasis of a basis B, the basis B having been calculated from a transformation of a canonical basis A by a transformation matrix X, the master public key being used to encrypt text to generate ciphertext,
acquiring a master secret key that includes a subbasis of a basis B*, the basis B* having been calculated from a transformation of the canonical basis A by a transformation matrix (XT)-1 that was generated from the transformation matrix X, the acquired master secret key being used to generate a user secret key,
multiplying the subbasis of the basis B included in the master public key by a transformation matrix W so as to update the subbasis of the basis B, thereby generating a new master public key, and
multiplying the subbasis of the basis B* included in the master secret key by a transformation matrix (WT)-1 generated from the transformation matrix W so as to update the subbasis of the basis B*, thereby generating a new master secret key,
wherein the transformation matrix W is further used to update the ciphertext without decrypting the ciphertext,
the transformation matrix (WT)-1 is further used to update the user secret key, and
the updated user secret key is used to decrypt the updated ciphertext to obtain the text,
wherein updating the ciphertext and decrypting the updated ciphertext is performed within different apparatuses remote from the master key update apparatus.

2. The cryptographic system according to claim 1, further comprising
a ciphertext update apparatus including
a computer processor, and
a memory storing instructions which, when executed by the computer processor, performs a process including,
acquiring the ciphertext, which includes a cipher element being a vector on the basis B, and
multiplying the cipher element included in the ciphertext by the transformation matrix W, so as to update the cipher element.

3. The cryptographic system according to claim 1, further comprising
a user secret key update apparatus including
a computer processor, and
a memory storing instructions which, when executed by the computer processor, performs a process including,
acquiring the user secret key, which includes a key element being a vector on the basis B*, and
multiplying the key element included in the user secret key by the transformation matrix (WT)-1, so as to update the key element.

4. A master key update apparatus comprising:
a computer processor, and
a memory storing instructions which, when executed by the computer processor, performs a process including,
acquiring a master public key that includes a subbasis of a basis B, the basis B having been calculated from a transformation of a canonical basis A by a transformation matrix X, the master public key being used to encrypt text to generate ciphertext, acquiring a master secret key that includes a subbasis of a basis $B^*$, the basis $B^*$ having been calculated from a transformation of the canonical basis A by a transformation matrix $(X^T)^{-1}$ that was generated from the transformation matrix X, the acquired master secret key being used to generate a user secret key, multiplying the subbasis of the basis B included in the master public key acquired by the master key acquisition part, by a transformation matrix W so as to update the subbasis of the basis B, thereby generating a new master public key, and multiplying the subbasis of the basis $B^*$ included in the master secret key acquired by the master key acquisition part, by a transformation matrix $(W^T)^{-1}$ generated from the transformation matrix W so as to update the subbasis of the basis $B^*$, thereby generating a new master secret key, wherein the transformation matrix W is further used to update the ciphertext without decrypting the ciphertext, the transformation matrix $(W^T)^{-1}$ is further used to update the user secret key, and the updated user secret key is used to decrypt the updated ciphertext to obtain the text, wherein updating the ciphertext and decrypting the updated ciphertext is performed within different apparatuses remote from the master key update apparatus.

5. A non-transitory computer readable recording medium storing a master key update program which causes a computer to execute a master key acquisition process to acquire a master public key that includes a subbasis of a basis B, the basis B having been calculated from a transformation of a canonical basis A by a transformation matrix X, the master public key being used to encrypt text to generate ciphertext, and acquire a master secret key that includes a subbasis of a basis $B^*$, the basis $B^*$ having been calculated from a transformation of the canonical basis A by a transformation matrix $(X^T)^{-1}$ that was generated from the transformation matrix X, the acquired master secret key being used to generate a user secret key; and a master key update process to multiply the subbasis of the basis B included in the master public key acquired by the master key acquisition process, by a transformation matrix W so as to update the subbasis of the basis B, thereby generating a new master public key, and multiply the subbasis of the basis $B^*$ included in the master secret key acquired by the master key acquisition process, by a transformation matrix $(W^T)^{-1}$ generated from the transformation matrix W so as to update the subbasis of the basis $B^*$, thereby generating a new master secret key, wherein the transformation matrix W is further used to update the ciphertext without decrypting the ciphertext, the transformation matrix $(W^T)^{-1}$ is further used to update the user secret key, and the updated user secret key is used to decrypt the updated ciphertext to obtain the text, wherein updating the ciphertext and decrypting the updated ciphertext is performed within different apparatuses remote from the master key update apparatus.

* * * * *